(12) United States Patent
Sudou

(10) Patent No.: US 9,230,349 B2
(45) Date of Patent: Jan. 5, 2016

(54) ELECTRONIC DEVICE AND CONTROL METHOD THEREFOR

(75) Inventor: Tomohiro Sudou, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 341 days.

(21) Appl. No.: 13/704,518

(22) PCT Filed: Jun. 16, 2011

(86) PCT No.: PCT/JP2011/063787
§ 371 (c)(1),
(2), (4) Date: Dec. 14, 2012

(87) PCT Pub. No.: WO2011/158896
PCT Pub. Date: Dec. 22, 2011

(65) Prior Publication Data
US 2013/0088496 A1    Apr. 11, 2013

(30) Foreign Application Priority Data

Jun. 16, 2010 (JP) ................. 2010-137670

(51) Int. Cl.
| G06T 11/20 | (2006.01) |
| G06F 3/023 | (2006.01) |
| H04M 1/2745 | (2006.01) |
| H04M 1/56 | (2006.01) |

(52) U.S. Cl.
CPC ............. *G06T 11/20* (2013.01); *G06F 3/0237* (2013.01); *H04M 1/274566* (2013.01); *H04M 1/56* (2013.01)

(58) Field of Classification Search
CPC ..... G06F 3/0233; G06F 3/0236; G06F 17/24; G06F 3/02; G06F 17/276; G06F 3/018; G06F 3/0238; G06F 17/21; G06F 17/2735; G06F 3/04886; G06F 3/0489; H04M 2250/70; H04M 21/26613; H04M 1/274558; H04M 1/274508; H04M 2250/18; H04M 3/4931; G01C 21/3611; H03M 11/04; H04N 1/00411; H04N 1/00384
USPC ................................................ 345/467, 468
See application file for complete search history.

(56) References Cited

U.S. PATENT DOCUMENTS

| 2009/0058816 A1* | 3/2009 | Takeuchi ................. 345/169 |
| 2010/0008490 A1* | 1/2010 | Gharachorloo et al. . 379/216.01 |
| 2012/0229376 A1* | 9/2012 | Matsumoto et al. .......... 345/156 |

FOREIGN PATENT DOCUMENTS

| JP | 11-341139 A | 12/1999 |
| JP | 2002-366288 A | 12/2002 |
| JP | 2009-223565 A | 10/2009 |

OTHER PUBLICATIONS

English Translation of IDS JP2002366288A, Dec. 15, 2014.*
English Translation of IDS JP2009223565A, Dec. 15, 2014.*
International Search Report for PCT/JP2011/063787, mailed on Sep. 27, 2011.

* cited by examiner

*Primary Examiner* — Kee M Tung
*Assistant Examiner* — Yuehan Wang
(74) *Attorney, Agent, or Firm* — Hauptman Ham, LLP

(57) ABSTRACT

An electronic device and a control method enable easily inputted characters or numbers to be converted and used in an application. When characters are inputted via input keys and the inputted characters are determined to match at least part of prescribed characters stored in a memory, a control unit keeps the inputted characters displayed on a display unit while also displaying, on the display unit, prescribed numbers associated with the prescribed characters. Then, with the inputted characters and prescribed numbers displayed on the display unit, if an instruction is given to start up an application related to the inputted characters and prescribed numbers, the control unit starts up the application, inputting either the inputted characters or the prescribed numbers.

13 Claims, 18 Drawing Sheets

(a)

| POSITION INFORMATION OF KEY | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| POSITION INFORMATION OF KEY | NUMBER OF SUCCESSIVE PRESSURE | KEY ASSIGNMENT |
|---|---|---|
| ⋮ | | ⋮ |
| X2, Y1 | 1 | A |
| | 2 | I |
| | 3 | U |
| | 4 | E |
| | 5 | O |
| | | ⋮ |

| POSITION INFORMATION OF KEY | KEY ASSIGNMENT |
|---|---|
| ⋮ | ⋮ |
| X2, Y1 | 1 ch |
| X2, Y2 | 2 ch |
| X2, Y3 | 3 ch |
| X3, Y1 | 4 ch |
| X3, Y2 | 5 ch |
| X3, Y3 | 6 ch |
| ⋮ | ⋮ |

FIG. 6

| WORD | WORD CLASS | CLASSIFICATION 1 | CLASSIFICATION 2 | PREFIX CODE | MEANING |
|---|---|---|---|---|---|
| AMERIKA | PROPER NOUN | COUNTRY NAME | | 1 | ... |
| ... | ... | ... | ... | ... | ... |
| NIHON | PROPER NOUN | COUNTRY NAME | | 81 | ... |
| ETIOPIA | PROPER NOUN | COUNTRY NAME | | 251 | ... |
| WAKAYAMA | PROPER NOUN | PREFECTURE NAME | CITY NAME | 734 | ... |
| CHOFU | PROPER NOUN | CITY NAME | | 042 | ... |
| ... | ... | ... | ... | ... | ... |

44a

ELECTRONIC DEVICE AND CONTROL METHOD THEREFOR

CROSS-REFERENCE TO RELATED APPLICATIONS

This application is the National Stage of International Application No. PCT/JP2011/063787, filed Jun. 16, 2011, which claims the benefit of Japanese Application No. 2010-137670, filed Jun. 16, 2010, the entire contents of all of which are incorporated by reference herein.

FIELD OF THE INVENTION

The present invention relates to an electronic device in which a character and a numerical character can be input, and a control method thereof.

BACKGROUND OF THE INVENTION

Conventionally, an electronic device such as a portable telephone device includes operation keys with which characters and numerical characters can be input, and realizes input of characters and numerical characters by switching between a character input mode for inputting characters and a numerical character input mode for inputting numerical characters.

As an example of such an electronic device, an electronic device has been proposed that, in a case in which a country name is input in a character input mode and then a telephone number is input in a numerical character input mode, places an international call by converting the country name thus input to a corresponding country code (see Patent Document 1).

Patent Document 1: Japanese Unexamined Patent Application, Publication No. H11-341139

SUMMARY OF THE INVENTION

Problems to be Solved by the Invention

However, the electronic device disclosed in Patent Document 1 must be set to the character input mode for inputting a country name and a numerical character input mode for inputting a telephone number, requiring a complicated operation for switching between input modes.

An objective of the present invention is to provide an electronic device that can easily convert a character and a numerical character being input to be used in an application, and a control method thereof.

Means for Solving the Problems

An electronic device according to the present invention comprises: an operation key to which a character is assigned; a display unit; a storage unit that stores a predetermined character and a predetermined numerical character in association with each other; and a control unit that, in a case in which an operation key is operated and a character assigned to the operation key is input and displayed on the display unit as an input character and the input character is determined to be at least a part of the predetermined character stored in the storage unit, maintains the display of the input character on the display unit and displays the predetermined numerical character associated with the predetermined character on the display unit, in which, in a case in which a activation instruction for an application related to the input character or the predetermined numerical character is given in a state in which the input character and the predetermined numerical character are displayed on the display unit, the control unit activates the application in a state in which any one of the input character and the predetermined numerical character is input thereto.

In addition, it is preferable that a numerical character, in addition to the character, is assigned to one of the operation key; and upon operation on the operation key, the control unit inputs and displays on the display unit the character and the numerical character assigned to the operation key as an input character and an input numerical character.

In addition, it is preferable that, in a case in which the input character is determined to be at least a part of the predetermined character stored in the storage unit, the control unit displays the predetermined numerical character instead of displaying the input numerical character being input by an operation on the operation key and displayed.

In addition, it is preferable that the storage unit further stores a registered character that can be registered in advance; and in a case in which the input character being input by an operation on the operation key corresponds to the registered character stored in the storage unit, the control unit continues display of the input character and clears display of the input numerical character.

In addition, it is preferable that in a case in which the input numerical character being input by an operation on the operation key corresponds to the predetermined numerical character stored in the storage unit, the control unit searches for the predetermined character stored in association with the predetermined numerical character and displays the predetermined character thus searched instead of the input character on the display unit being input by an operation on the operation key.

In addition, it is preferable that in a case in which an input character and an input numerical character are input by an operation on the operation key and a part of the input character is determined to be at least a part of the predetermined character, the control unit clears display of the input numerical character being input along with the input character and appends the predetermined numerical character stored in the storage unit in association with the predetermined character in front of the input numerical character being displayed on the display unit.

In addition, it is preferable that the control unit makes the input character and the predetermined numerical character displayed on the display unit selectable and activates the application in a state in which the input character or the predetermined numerical character thus selected is input thereto.

In addition, it is preferable that the electronic device further includes a detection unit that is disposed to correspond to a surface of the display unit and detects contact on the display unit, in which: the operation key is displayed on the display unit; and the display unit detects an operation by the operation key in response to contact to the display unit.

In addition, it is preferable that the control unit accepts an operation by the operation key in a state in which a regular screen is displayed on the display unit.

In addition, it is preferable that the predetermined character stored in the storage unit is a country name or a region name; and the predetermined numerical character stored in the storage unit is a country code or a region code.

In addition, it is preferable that the predetermined character is a name registered in an address book in the storage unit; and the predetermined numerical character is a telephone number registered in the address book in association with the name.

In addition, it is preferable that the application related to the predetermined numerical character is a telephone application.

A control method of an electronic device according to the present invention includes steps of: inputting an input character by an operation on an operation unit; determining whether or not the input character thus input is at least a part of a predetermined character stored in the storage unit; in a case in which the input character thus input is determined to be at least a part of the predetermined character stored in the storage unit, maintaining display of the input character on a display unit and displaying a predetermined numerical character stored in the storage unit in association with the predetermined character on the display unit; and in a case in which an activation instruction for an application related to the input character or the predetermined numerical character is given in a state in which at least the input character and the predetermined numerical character are displayed on the display unit, activating the application in a state in which any one of the input character and the predetermined numerical character is input thereto.

Effects of the Invention

According to the present invention, an electronic device that can easily convert a character and a numerical character being input to be used in an application, and a control method thereof can be provided.

BRIEF DESCRIPTION OF THE DRAWINGS

FIG. 6 is a diagram illustrating an example of a dictionary table stored in memory;

DETAILED DESCRIPTION OF THE INVENTION

Figure 1:
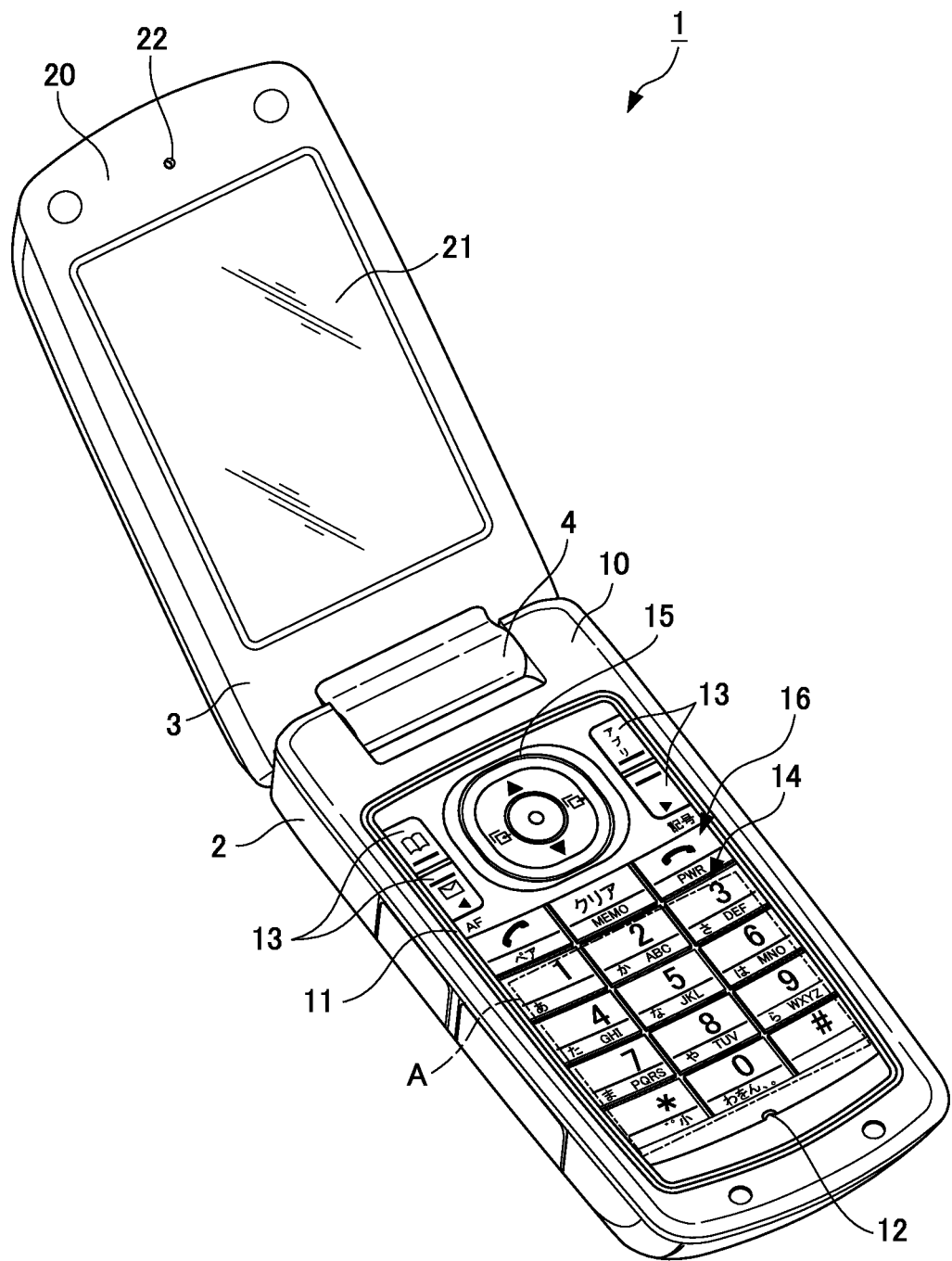
FIG. 1 is a perspective view showing the appearance of a portable telephone device according to the present embodiment.

FIG. 1 is a perspective view showing the appearance of a portable telephone device 1 as an embodiment of an electronic device according to the present invention. Although FIG. 1 shows what is called a folding-type portable telephone device, the portable telephone device according to the present invention is not particularly limited thereto. The portable telephone device may be of, for example: a slider type in which one body slides to one direction from a state in which two bodies are mutually superimposed; a rotating type (turning type) in which one body is rotated about an axis line along the direction in which two bodies are superimposed; or a type in which an operation unit and a display unit are arranged in one body without a connection unit (straight type, flip type).

The portable telephone device 1 includes an operation unit side body 2 and a display unit side body 3. The operation unit side body 2 includes, on a front face portion 10 thereof, an operation unit 11 and a microphone 12 to which sound produced by a user of the portable telephone device 1 during a phone call is input. The operation unit 11 is configured with: function setting operation keys 13 for operating various functions such as for various settings, a telephone number directory function and a mail function; input operation keys 14 for inputting the digits of a telephone number and characters for mail, and the like; and a selection operation key 15 for performing selection of the various operations, scrolling, and the like. The function setting operation keys 13, input operation keys 14, and a selection operation key 15 can be arranged on a touch screen integrally configured with the display unit 21. In a case in which the function setting operation keys 13, input operation keys 14, and a selection operation key 15 are arranged on the touch screen integrally configured with the display unit 21, a detection unit is further provided for detecting contact to the touch screen. The detection unit detects various operations in response to contact to the touch screen.

The display unit side body 3 includes, on a front face portion 20, a display unit 21 for displaying a variety of information, and a receiver 22 for outputting sound of the other party of the conversation.

An upper end portion of the operation unit side body 2 and a lower end portion of the display unit side body 3 are connected via a hinge mechanism 4. The portable telephone device 1 can be in a state where the operation unit side body 2 and the display unit side body 3 are apart from each other (an opened state), and in a state where the operation unit side body 2 and the display unit side body 3 are contacting each other (a folded state), as the operation unit side body 2 and the display unit side body 3, connected via the hinge mechanism 4, pivot with respect to each other.

Figure 2:
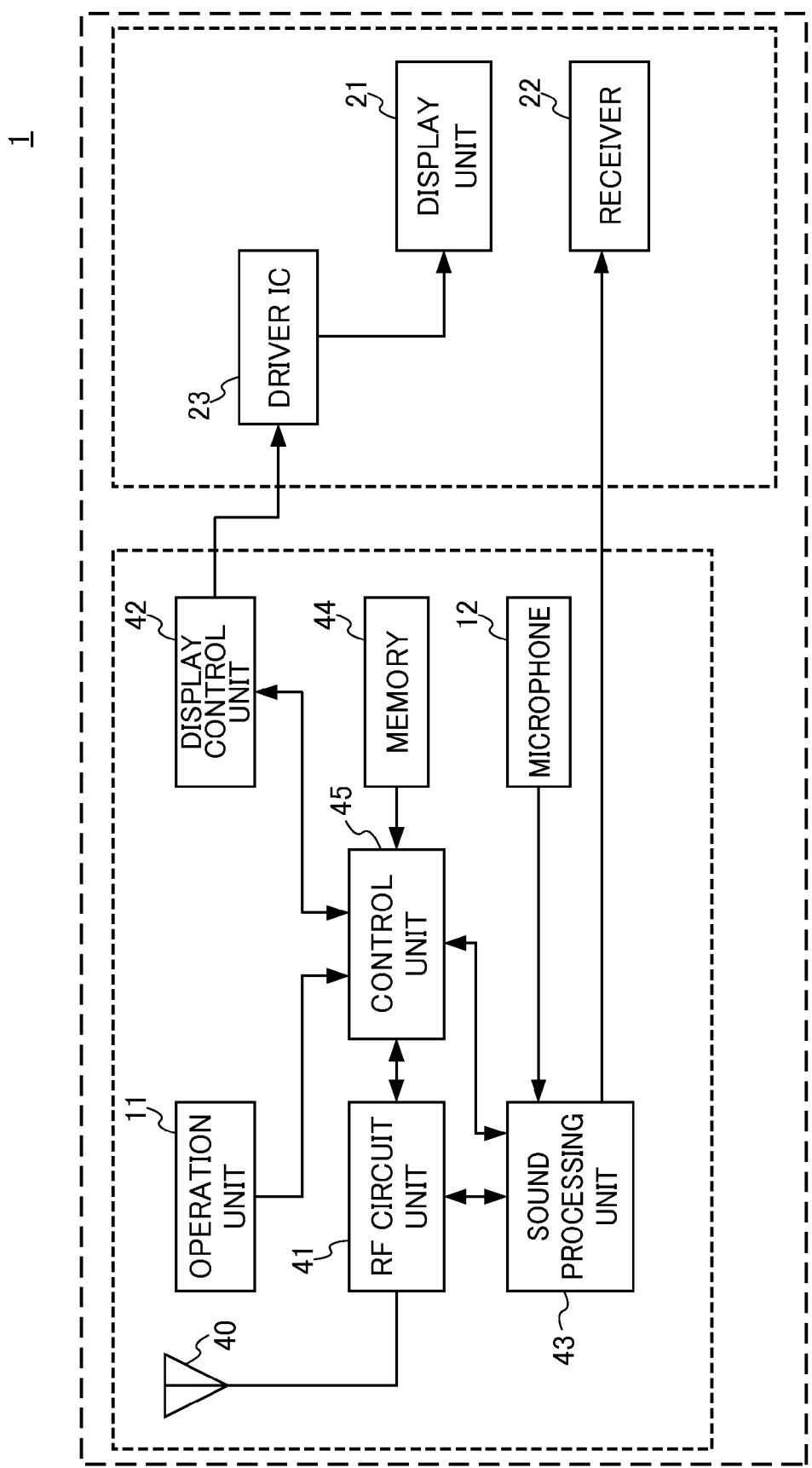
FIG. 2 is a functional block diagram showing functions of the portable telephone device according to the present embodiment.

FIG. 2 is a functional block diagram showing functions of the portable telephone device 1. In the portable telephone device 1, for example as shown in FIG. 2, the operation unit side body 2 includes the operation unit (input unit) 11, the microphone 12, a main antenna 40, an RF circuit unit 41, a display control unit 42, a sound processing unit 43, memory 44, and a control unit 45. In the portable telephone device 1, the display unit side body 3 includes the display unit 21, the receiver 22, and a driver IC 23.

The main antenna 40 communicates with a base station or the like via a first usable frequency band (for example, 800 MHz), and is configured as a dual band compatible antenna that is compatible with a second usable frequency band (for example, 1.5 GHz) for GPS communication. Although 800 MHz is set as the first usable frequency band in the present embodiment, other frequency bands can also be used. The main antenna 40 may communicate with an external device via the first usable frequency band, and another antenna compatible with the second usable frequency band for GPS communication may be separately provided.

The RF circuit unit 41 performs demodulation processing of a signal received via the main antenna 40, and transmits the processed signal to the control unit 45. The RF circuit unit 41 performs modulation processing of the signal transmitted from the control unit 45, and transmits the signal to external devices (base stations) via the main antenna 40. On the other hand, the RF circuit unit 41 notifies the control unit 45 of the intensity of a signal received via the main antenna 40.

The display control unit 42 performs predetermined image processing according to control by the control unit 45, and outputs the processed image data to the driver IC 23. When the image data is transmitted from the display control unit 42, the driver IC 23 stores the image data in frame memory, and outputs the image data on the display unit 21 at predetermined timing.

The sound processing unit 43 performs predetermined sound processing according to control by the control unit 45 on a signal transmitted from the RF circuit unit 41, and outputs the processed signal to the receiver 22 or a speaker (not illustrated). The receiver 22 outputs the signal that is transmitted from the sound processing unit 43, to the outside.

When a signal is input from the microphone 12, the sound processing unit 43 processes the signal according to control by the control unit 45, and outputs the processed signal to the RF circuit unit 41. The RF circuit unit 41 performs predetermined processing on the signal transmitted from the sound processing unit 43, and outputs the processed signal to the main antenna 40.

The memory 44 includes, for example, working memory, and is utilized for arithmetic processing by the control unit 45. The memory 44 stores a plurality of applications as well as a variety of tables and the like, required by the applications. The memory 44 may also serve as detachable external memory.

The control unit 45 controls the entirety of the portable telephone device 1, and is configured to employ a central processing unit (CPU) and the like. Here, a description is provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated. In a case in which the operation unit is disposed on the touch panel integrally configured with the display unit 21, display of the operation keys (touch keys) is changed according to characters and functions assigned thereto.

Figures 3A, 3B, 3C, 3D:
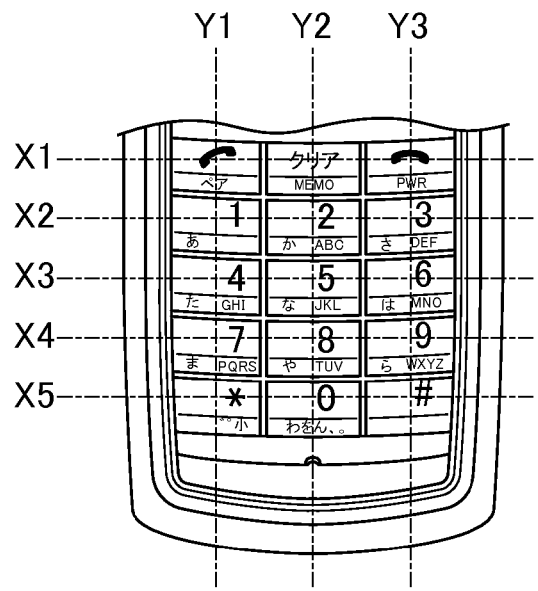
FIG. 3 is a diagram illustrating key assignment according to the present embodiment.

More specifically, when any key is depressed, the operation unit 11 transmits position information of the key to the control unit 45 (for example, as shown in FIG. 3A?, in a case of depressing a key in the second line and the left row among the input operation keys 14 (a key with "1" and "a" printed on its surface; "a" is a Japanese hiragana character pronounced as "a" in the Hepburn system; hereinafter simply referred to as "a"?), position information of (X2, Y1) is transmitted). The control unit 45 accesses the memory 44, refers to a key assignment table corresponding to an application that is currently activated, and executes processing of a character and a function assigned thereto, based on the position information that has been transmitted from the operation unit 11. For example, as shown in FIGS. 3B to 3D, the memory 44 stores a plurality of key assignment tables. FIG. 3B is a table that is utilized when an outgoing telephone call is made; FIG. 3C is a table that is utilized in a memo pad application and a mail application; and FIG. 3D is a table that is utilized when changing a channel in a television tuner application.

Execution of processing of a character means that, for example, in a case in which the currently activated application is a memo pad application, "1" or "a" is input as an input character and displayed on the display unit 21. Execution of processing of a function means that, for example, in a case in which the currently activated application is a television tuner application, the display channel is set to channel 1.

The memory 44 stores a plurality of key assignment tables. Depending on the application, the control unit 45 switches a key assignment table to be referred to, refers to a predetermined key assignment table based on position information of a key that has been transmitted from the operation unit 11, and performs predetermined processing.

In this way, the portable telephone device 1 with such a configuration has a function, in which, in a case in which a key operation is performed in the standby state for communication, a plurality of characters (for example, a numeric character and another type of character) assigned to the key are displayed, for example, on separate screen areas in parallel, respectively, and in a case in which a predetermined key operation is performed, a screen displaying one of the characters is activated. In a case in which a key operation is performed in a communication standby state, one of a plurality of symbols (for example, a character) assigned to the key may be displayed.

The portable telephone device 1 has a function to display conversion candidates or subsequent predictive candidates for a character that has been input via the operation unit 11. Furthermore, the portable telephone device 1 has a function to execute an application in a case in which a name of the application or a character string indicating the processing details related to the application is input by selecting such a conversion candidate or a predictive candidate.

Figure 4:
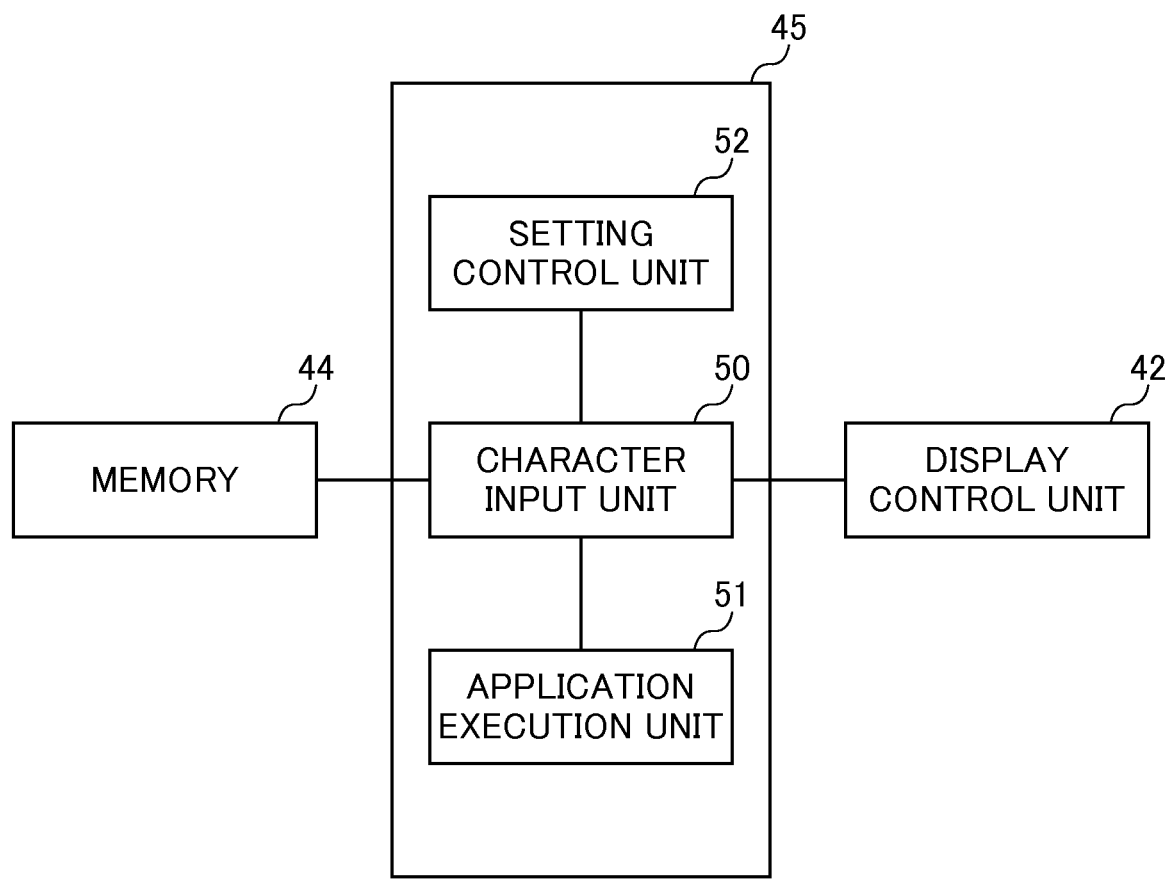
FIG. 4 is a functional block diagram showing functions of a control unit according to the present embodiment.

Here, operations for exhibiting the aforementioned functions are described. As shown in FIG. 4, the control unit 45 of the portable telephone device 1 includes a character input unit 50, an application execution unit 51, and a setting control unit 52.

In a case in which the user performs a key operation, the character input unit 50 controls the display control unit 42 to display characters assigned to the key. The character input unit 50 extracts, from the memory 44, conversion candidates or predictive candidates for the character that has been input, and displays the candidates on the display unit 21 via the display control unit 42.

The memory 44 stores a prediction DB (not illustrated) in which conversion candidates and predictive candidates are registered and managed. Based on the character that has been input, the character input unit 50 searches the prediction DB to extract kanji character conversion candidates or the like as well as predictive candidates as characters to follow thereafter.

Based on the character that has been input, the character input unit 50 extracts, from the memory 44, candidates as applications included in the portable telephone device 1, or operations (processing) in an application so as to be displayed among conversion candidates or predictive candidates. More specifically, for example, in a case in which a hiragana character "ka" is input, the character input unit 50 displays "camera" as a predictive candidate that is an application with its initial character pronounced as "ka" in Japanese. Subsequently, in a case in which "camera" is input, or in a case in which "camera" is selected as a predictive candidate, processing names such as "activate" and "how to use" are displayed as predictive candidates as the processing details in the camera application.

Activities included in the portable telephone device 1 (such as names of applications, processing names in the applications, and in addition, names of functions for setting states of the portable telephone device 1) are stored as data in an activity candidate DB in the memory 44.

In a case in which the user selects an application name or a processing name, the application execution unit 51 executes the corresponding application (for example, camera, mail, television tuner, etc.) or a specific operation (process) of the application.

In addition to executing the applications included in the portable telephone device 1, the character input unit 50 extracts, from the memory 44, names of functions for setting a state of the portable telephone device 1 (for example, silent mode, radio-wave-off mode, etc.) so as to be displayed as conversion candidates or predictive candidates. In accordance with such a function name thus selected, the setting control unit 52 performs setting of a state of the portable telephone device 1.

Next, a control for converting a character and a numerical character being simply input and using the character and the numerical character in an application are described hereinafter.

In the present embodiment, "character" is defined to include characters except for numerical characters (hiragana characters, katakana characters, alphabetical characters, symbols and the like). "Numerical character" is defined to include numerical characters and the like used for placing a phone call (0 to 9, *, #, p for pause, and - (hyphen)). The "character" and the "numerical character" are defined to include not only single characters and single numerical characters, but also character strings and numerical character strings. As used herein, a "regular screen" is a screen displayed during standby for incoming calls and activation of an application, and may also be referred to as "standby screen", "initial screen", "wallpaper", and "desktop".

The control unit 45 according to the present embodiment, in a case in which the operation key 14 is operated and a character is input as an input character and the input character is determined to be at least a part of the predetermined character stored in the memory 44, maintains the display of the input character on the display unit 21 and displays a predetermined numerical character associated with the predetermined character on the display unit 21.

In a case in which an activation instruction for an application related to the input character or the predetermined numerical character is given in a state in which the input character and the predetermined numerical character are displayed on the display unit 21, the control unit 45 activates the application in a state in which any one of the input character and the predetermined numerical character is input thereto.

Figure 5:
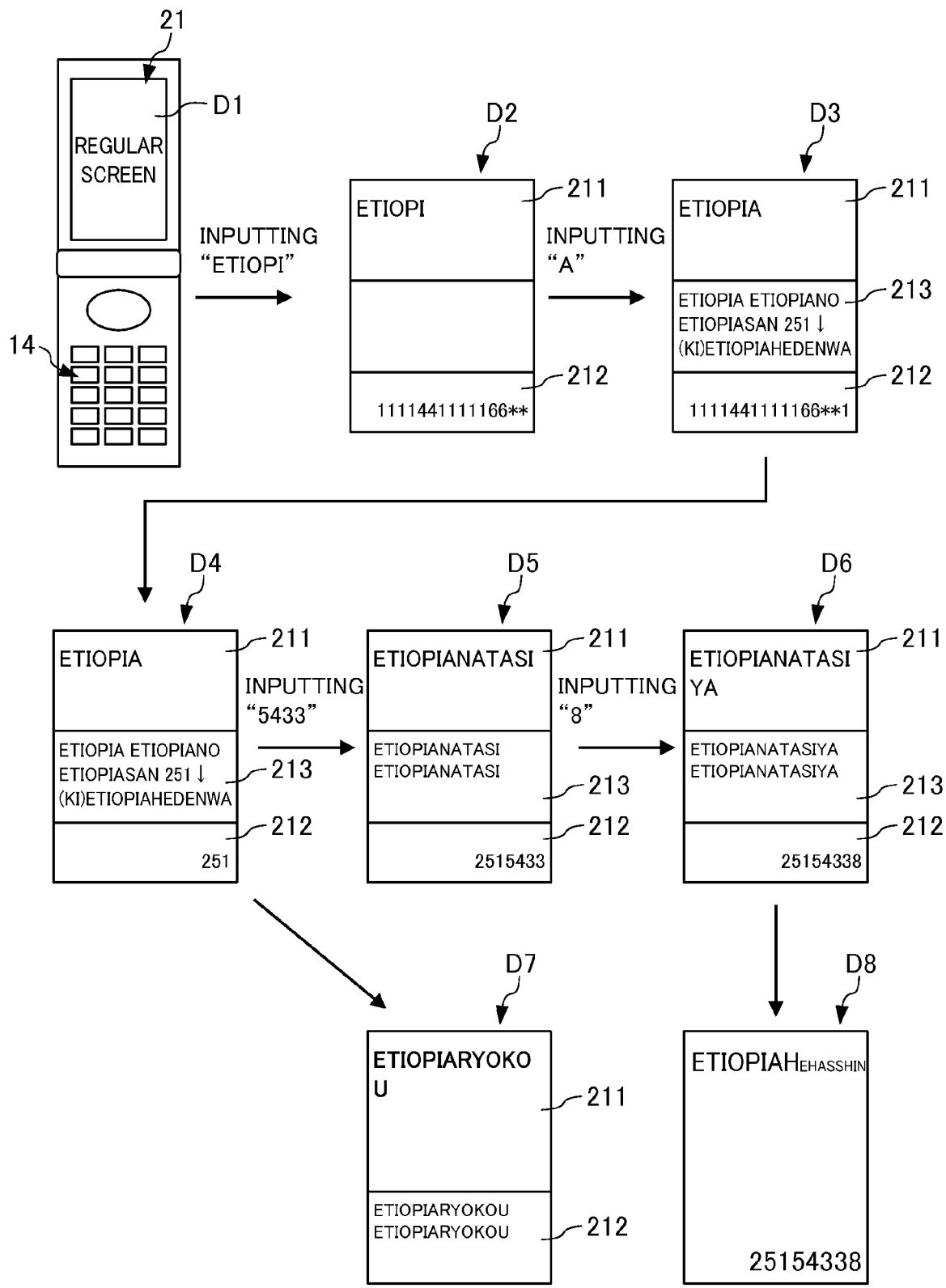
FIG. 5 is a diagram illustrating an example of screen transitions displayed on a display unit according to the present embodiment.

More specifically, the control unit 45 performs the following processing. FIG. 5 is a diagram illustrating an example of screen transitions displayed on a display unit according to the present embodiment. In the present Specification, in addition to hiragana characters, katakana characters, and kanji characters in Japanese, Romanized spelling representing pronunciation of those characters is also provided in parentheses. In a state in which the regular screen D1 as an initial screen is displayed, if a character "etiopi" is input by operating the input operation keys 14, the control unit 45 inputs and displays hiragana characters "etiopi" assigned to the input operation keys 14 in a region 211 of the display unit 21, and inputs and displays a numerical character "1111441111166" assigned to the input operation keys 14 in the region 212 of the display unit 21 (screen D2 in FIG. 5). Alternatively, in a state in which the regular screen D1 as an initial screen is displayed, if the character "etiopi" is input by operating the input operation keys 14, the control unit 45 may be configured to input and display only the hiragana characters "etiopi" assigned to the input operation keys 14 in a region 211 of the display unit 21. The processing shown in screens D1 and D2 can be performed also in cases other than the case in which the regular screen D1 is displayed and a character is input by operating the input operation keys 14. For example, the control unit 45 may be configured to perform the processing shown in the screen D2 in a case in which only an editor is activated and a character is input by operating the input operation keys 14**.

In the screen D2, if a character "a" is input by operating the input operation key 14, the control unit 45 inputs and displays a hiragana character "a" assigned to the input operation key 14 in the region 211, and inputs and displays a numerical character "1" assigned to the input operation key 14 in the region 212 (screen D3 in FIG. 5). Furthermore, the control unit 45 displays in a region 213 of the display unit 21, "etiopia" (Japanese term corresponding to a country name Ethiopia consisting of katakana characters); "etiopiano" (consisting of katakana and hiragana characters); "etiopiasan" (consisting of katakana and kanji characters); "251↓"; "(ki) etiopiahedenwa" (consisting of symbol, kanji characters, katakana and hiragana characters) as conversion candidates (screen D3 in FIG. 5).

The "251↓" displayed as a conversion candidate in the region 213 indicates displaying the numerical character "251" in the region 212.

FIG. 6 is a diagram illustrating an example of a dictionary table 44a stored in the memory 44. As shown in FIG. 6, in the dictionary table 44a, a word as a conversion candidate is registered in association with a word class, classification 1, classification 2, a prefix code (numerical character), meaning, and the like. For example, a word "amerika" (Japanese term corresponding to a country name America) is registered in association with "proper noun" as the word class; "country name" as the classification 1; and "1" as the prefix code. Similarly, a word "etiopia" (Japanese term corresponding to a country name Ethiopia) is registered in association with "proper noun" as the word class; "country name" as the classification 1; and "251" as the prefix code.

In the screen D3, since the katakana characters "etiopia" displayed in the region 211 is registered in the dictionary table 44a in association with the numerical character "251" as the prefix code, the control unit 45 displays the numerical character "251" as the prefix code in the region 212 instead of displaying the numerical character "1111441111166**" being input by operating the input operation keys 14 (screen D4 in FIG. 5).

In the screen D4, if a numerical character "5433" is input by operating the input operation keys 14, the control unit 45 inputs and displays a hiragana character "natasi" assigned to the input operation keys 14 in the region 211, inputs and displays a numerical character "5433" assigned to the input operation keys 14 in the region 212, and displays characters "etiopianatasi" (consisting of katakana, hiragana and kanji characters) and "etiopianatasi" (consisting of katakana characters) as conversion candidates in the region 213 (screen D5 in FIG. 5).

In the screen D5, if a numerical character "8" is input by operating the input operation key 14, the control unit 45 inputs and displays a hiragana character "ya" assigned to the input operation key 14 in the region 211, inputs and displays a numerical character "8" assigned to the input operation keys 14 in the region 212, and displays characters "etiopianatasiya" (consisting of katakana, hiragana and kanji characters) and "etiopianatasiya" (consisting of katakana characters) as conversion candidates in the region 213 (screen D6 in FIG. 5).

In the screen D6, in a case in which the katakana character "etiopia" and "country name" are registered in the dictionary table 44a in association with each other and the character "natasiya" being subsequently input is not registered in the dictionary table 44a, the control unit 45 confirms input of the numerical character "25154338" displayed in the region 212. And then, if a call key 16 in the operation unit 11 is operated, the control unit 45 activates a telephone application and makes a call to the numerical character "2515433", while displaying a text "ETIOPIAHEHASSHIN" (Outgoing to ETHIOPIA) and the numerical character "2515433" (screen D8 in FIG. 5). Alternatively, the control unit 45 may be configured to, when the call key 16 in the operation unit 11 is operated, activate the telephone application after displaying a confirmation screen for making a call, and accepting a selection of making the call.

In addition, in the screen D4, in a case in which: the katakana character "etiopia" (Japanese term corresponding to a country name Ethiopia) and "country name" are registered in the dictionary table 44a in association with each other; a character "ryokou" (Japanese term corresponding to travel) being subsequently input is registered in another dictionary table; and the character "ryokou" is not a geographical name such as "country name" and "city name", the control unit 45 confirms an input of a hiragana character "etiopiaryokou" (Japanese term corresponding to travel to Ethiopia) and displays only the regions 211 and 213. And then, by selecting an application related to character (for example, a mail application, a memopad application, and the like), the application thus selected can be activated with the hiragana character "etiopiaryokou" being input therein.

As described above, according to the present embodiment, the portable telephone device 1 can easily convert character to numerical character and numerical character to character, and the character or the numerical character can be used in an application (for example, telephone application).

The control unit 45 makes the character and the numerical character displayed on the display unit 21 selectable and activates an application (for example, a telephone application) in a state in which the character or the numerical character thus selected is input thereto. The application can thus be activated in a state in which any one of the character and the numerical character is input thereto.

If the input operation key 14 is operated in a state in which the regular screen D1 is displayed on the display unit 21, the control unit 45 inputs and displays the character and a predetermined numerical character assigned to the input operation key 14 on the display unit 21, respectively. As a result, in the portable telephone device 1, a character can be input while visually recognizing the character and a predetermined numerical character assigned to the input operation key 14, thereby improving operability of the portable telephone device 1.

Moreover, the control unit 45 displays a predetermined numerical character (for example, "251") instead of displaying the numerical characters being input by operating the input operation keys 14 (for example, "1111441111166**"). As a result, in the portable telephone device 1, a user can input a desired numerical character without operating the input operation key 14.

The memory 44 may further store a registered character that can be registered in advance. Alternatively, the control unit 45 may be configured to, in a case in which a character being input by operating the input operation key 14 corresponds to the registered character (for example, "etiopia" and "ryokou") stored in the memory 44, maintain display of the character being input and clear display of the numerical character being input. As a result, in the portable telephone device 1, in a case in which a character is expected to be input by a user, a character can be displayed by cancelling display of a numerical character, to thereby improve user friendliness.

In the portable telephone device 1, the predetermined character registered in the dictionary table 44a is a country name or a region name, and the predetermined numerical character registered in the dictionary table 44a is a country code or a region code. As a result, in the portable telephone device 1, convenience in input operation of a telephone number for an international call or a toll call can be further improved.

The predetermined character can be a name registered in an address book stored in the memory 44, and the predetermined numerical character can be a telephone number registered in the address book in association with the name registered in the address book. The predetermined character can also be a name of an individual (for example, "birthday of Mr. Suzuki") in a schedule book stored in the memory 44, and the predetermined numerical character can be a numerical character indicating a birthday (for example, 19830901) registered in the schedule book in association with the name of an individual (for example, "birthday of Mr. Suzuki").

Figure 7:
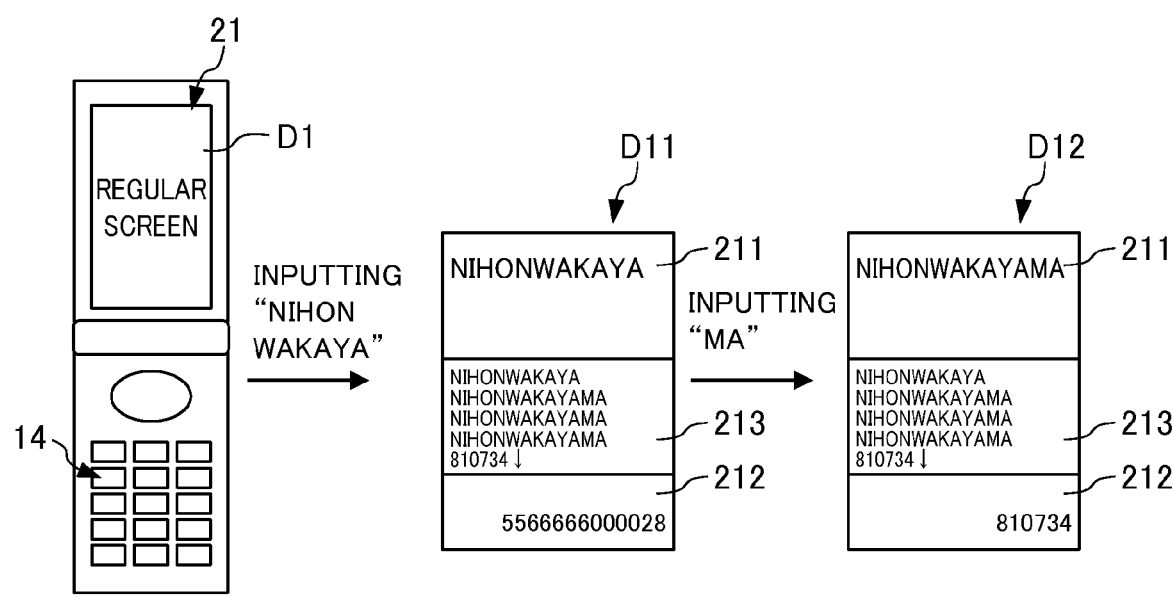
FIG. 7 is a diagram illustrating another example (1) of screen transitions displayed on the display unit according to the present embodiment.

FIG. 7 is a diagram illustrating another example of screen transitions displayed on the display unit 21 according to the present embodiment. In a state in which the regular screen D1 as an initial screen is displayed, if a character "nihonwakaya" is input by operating the input operation keys 14, the control unit 45 inputs and displays hiragana characters "nihonwakaya" assigned to the input operation keys 14 in the region 211, inputs and displays numerical characters "556666000028" in the region 212, and displays conversion candidates "nihonwakaya" (consisting of kanji characters), "nihonwakayama" (consisting of kanji characters), "nihonwakayama" (consisting of kanji characters differently), "nihonwakayama" (consisting of kanji characters yet differently), and "810734↓" in the region 213 (screen D11 in FIG. 7).

The "810734↓" in the region 213 displayed as a conversion candidate indicates displaying the numerical character "810734", consisting of a country code for Japan (81) and an area code for Wakayama (0734), in the region 212.

In the screen D11, if a character "ma" is input by operating the input operation key 14, the control unit 45 inputs and displays a hiragana character "ma" assigned to the input operation key 14 in the region 211, and displays characters "nihonwakayama", "nihonwakayama", "nihonwakayama" (differently consisting of kanji characters) and "810734↓" as conversion candidates in the region 213 (screen D12 in FIG. 7). Furthermore, in a case in which the hiragana character "nihon" and "country name" are registered in the dictionary table 44a in association with each other and the character "wakayama" being subsequently input is also registered in the dictionary table 44a, the control unit 45 displays the numerical character "810734" consisting of a country code for Japan (81) and an area code for Wakayama (0734) in the region 212, instead of the numerical character "5566666000028" (screen D12 in FIG. 7). The processing shown in screens D1, D11 and D12 can be performed also in cases other than the case in which the regular screen D1 is displayed and a character is input by operating the input operation keys 14. For example, the control unit 45 may be configured to perform the processing shown in the screens D11 and D12 in a case in which only an editor is activated and a character is input by operating the input operation keys 14.

Figure 8:
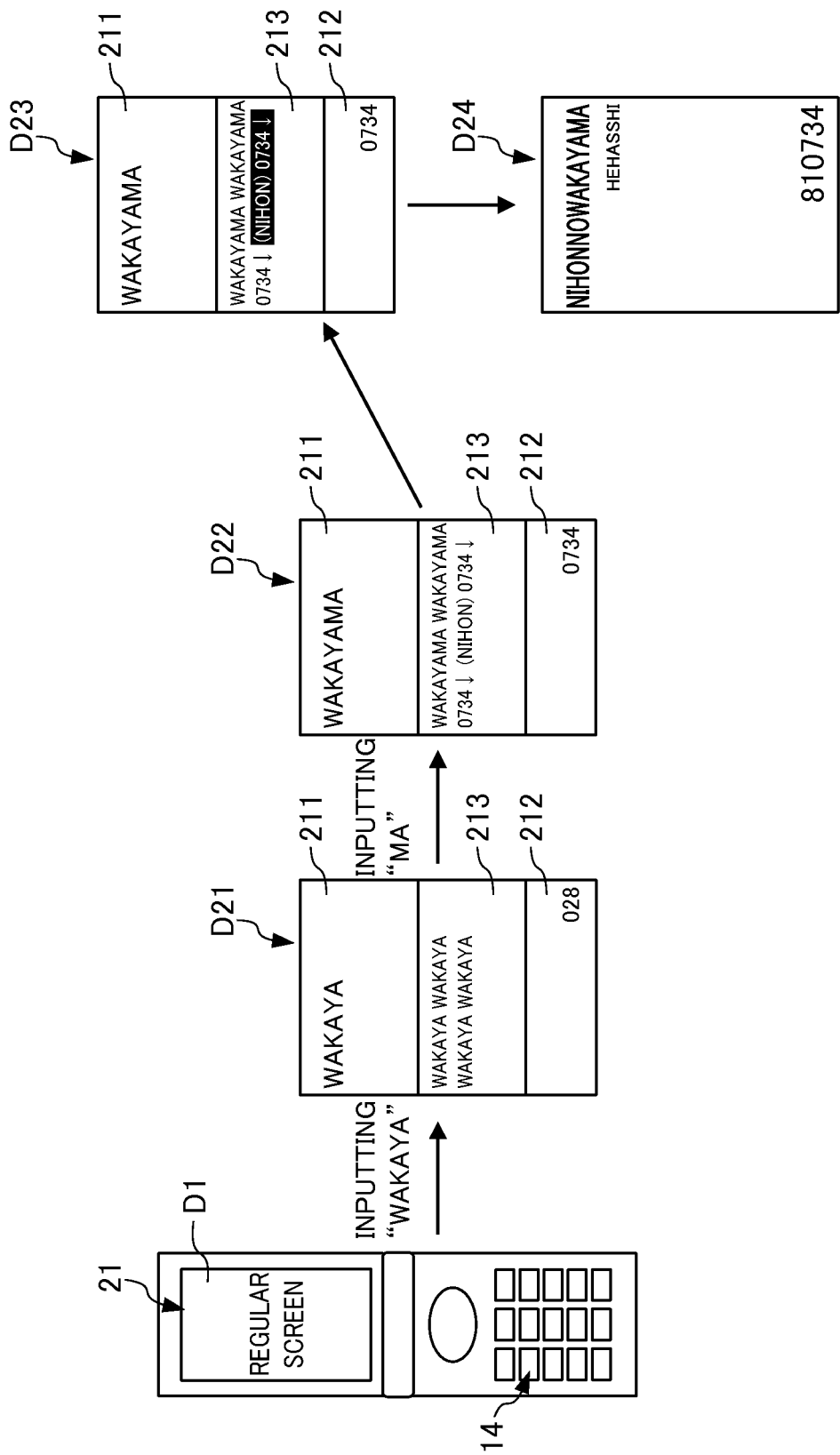
FIG. 8 is a diagram illustrating another example (2) of screen transitions displayed on the display unit according to the present embodiment.

FIG. 8 is a diagram illustrating another example of screen transitions displayed on the display unit 21 according to the present embodiment. In a state in which the regular screen D1 as an initial screen is displayed, if a character "wakaya" is input by operating the input operation keys 14, the control unit 45 inputs and displays hiragana characters "wakaya" assigned to the input operation keys 14 in the region 211, inputs and displays numerical characters "028" in the region 212, and displays conversion candidates "wakaya" (consisting of kanji characters), "wakaya" (consisting of kanji characters and a hiragana character), "wakaya" (consisting of kanji characters differently), and "wakaya" (consisting of kanji characters and hiragana characters) in the region 213 (screen D21 in FIG. 8).

In the screen D21, if a character "ma" is input by operating the input operation key 14, the control unit 45 inputs and displays a hiragana character "ma" assigned to the input operation key 14 in the region 211, and displays characters "wakayama", "wakayama" (consisting of kanji characters differently), "0734↓", and "(nihon) 0734↓" as conversion candidates in the region 213 (screen D22 in FIG. 8). And then, in a case in which the hiragana character "wakayama" is registered in the dictionary table 44a in association with "prefecture name" and "city name", the control unit 45 displays the numerical character "0734", which is an area code for Wakayama, in the region 212 instead of the numerical character "028" (screen D22 in FIG. 8).

The conversion candidate "0734↓" displayed in the region 213 indicates displaying the numerical character "0734" in the region 212, and the conversion candidate "(nihon) 0734↓" displayed in the region 213 indicates displaying the numerical character "810734" consisting of a country code for Japan (81) and an area code for Wakayama (0734) in the region 212.

In the screen D22, if the conversion candidate "(nihon) 0734↓" is selected by operating the selection operation key 15 or the like (screen D23 in FIG. 8), the control unit 45 activates a telephone application and makes a call to the numerical character "810734", while displaying a text "NIHONNOWAKAYAMAHEHASSHIN" (Outgoing to WAKAYAMA, JAPAN) and the numerical character "810734" (screen D24 in FIG. 8).

Alternatively, the control unit 45 according to the present embodiment can be configured to, in a case in which the numerical character being input by operating the input operation key 14 corresponds to the predetermined numerical character stored in the memory 44, display the predetermined character stored in the memory 44 in association with the predetermined numerical character instead of the character displayed on the display unit 21. The processing shown in screens D1 to D24 can be performed also in cases other than the case in which the regular screen D1 is displayed and a character is input by operating the input operation keys 14. For example, the control unit 45 may be configured to perform the processing shown in the screens D21 to D24 in a case in which only an editor is activated and a character is input by operating the input operation keys 14.

Figure 9:
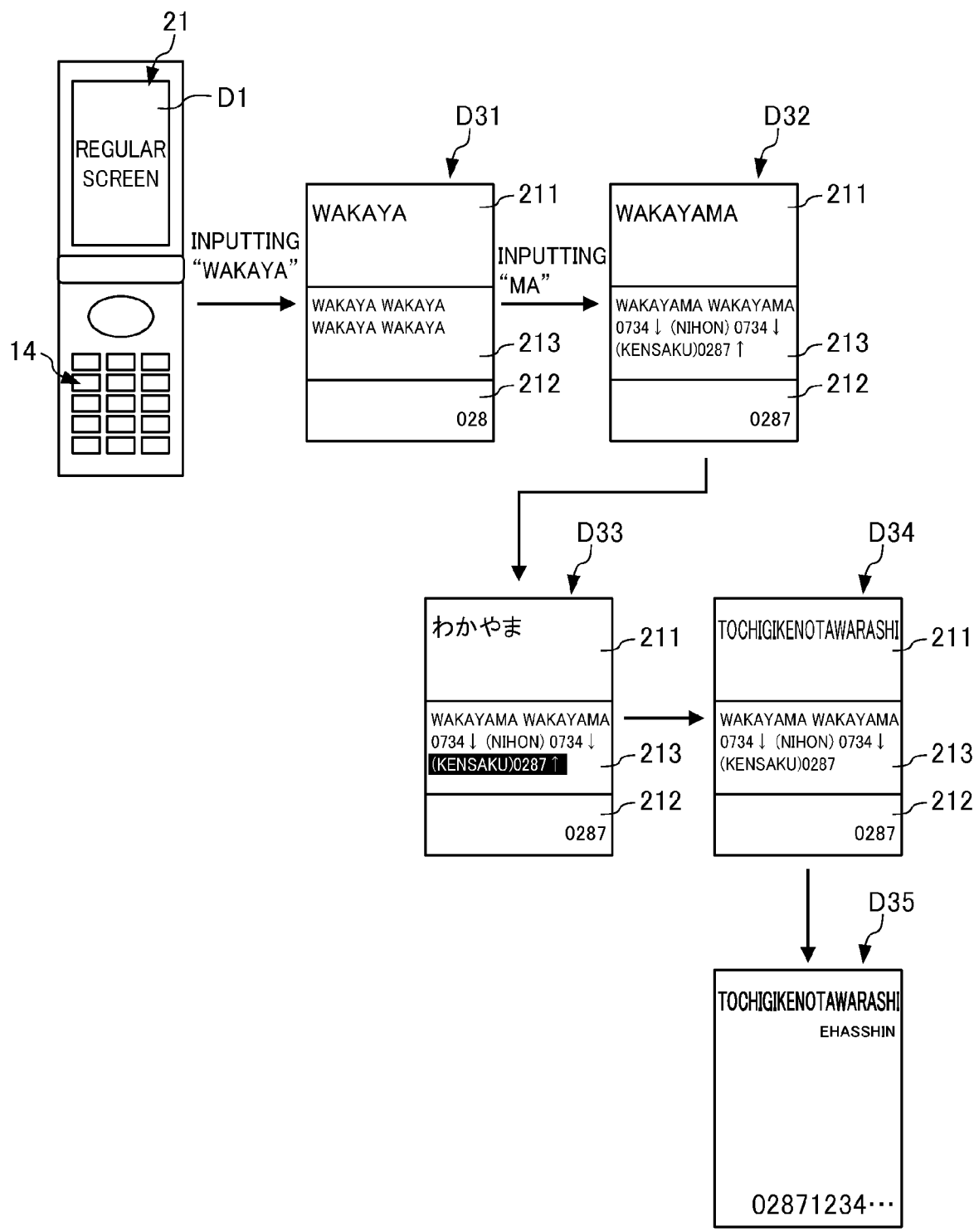
FIG. 9 is a diagram illustrating another example (3) of screen transitions displayed on the display unit according to the present embodiment.

More specifically, the control unit 45 performs the following processing. FIG. 9 is a diagram illustrating another example of screen transitions displayed on the display unit 21 according to the present embodiment. In a state in which the regular screen D1 as an initial screen is displayed, if a character "wakaya" is input by operating the input operation keys 14, the control unit 45 inputs and displays hiragana characters "wakaya" assigned to the input operation keys 14 in the region 211, inputs and displays numerical characters "028" in the region 212, and displays conversion candidates "wakaya" (consisting of kanji characters), "wakaya" (consisting of kanji characters and a hiragana character), "wakaya" (consisting of kanji characters differently), and "wakaya" (consisting of kanji characters and hiragana characters) in the region 213 (screen D31 in FIG. 9).

In the screen D31, if a character "ma" is input by operating the input operation key 14, the control unit 45 inputs and displays a hiragana character "ma" assigned to the input operation key 14 in the region 211, inputs and displays the numerical character "0287" assigned to the input operation key 14, and displays characters "wakayama", "wakayama" (differently consisting of kanji characters), "0734↓", "(nihon) 0734↓", and "(kensaku) 0287↑" as conversion candidates in the region 213 (screen D32 in FIG. 9).

Here, the conversion candidate "(kensaku) 0287↑" displayed in the region 213 indicates searching for a region name having "0287" as a region code such as a country code or an area code, and displaying the region name thus searched in the region 211.

In the screen D32, if the conversion candidate "(kensaku) 0287↑" is selected by operating the selection operation key 15 and the like (screen D33 in FIG. 9), the control unit 45 searches for a region name having "0287" using a region name table, in which region codes such as country codes and area codes are registered in association with geographical names such as country names and region names, in the memory 44. And then, the control unit 45 displays a region name "TochigikenOtawarasi" (Otawara city, Tochigi prefecture, Japan), which is registered in association with "0287", instead of the hiragana character "wakayama" displayed in the region 211.

In the screen D34, if a numerical character "1234 . . . " is input by operating the input operation keys 14 and the call key 16 of the operation unit 11 is operated, the control unit 45 activates a telephone application and makes a call to a numerical character "02871234 . . . ", while displaying a character "TOCHIGIKENOTAWARASHIHEHASSHIN" (indicating call to Otawara city, Tochigi prefecture, Japan) and the numerical character "02871234 . . . " (screen D35 in FIG. 9).

As described above, in the present embodiment, the control unit 45 uses the numerical character being input by operating the input operation keys 14 to search a predetermined character (for example, "TochigikenOtawarasi") stored in the memory 44 in association with the numerical character, and display the predetermined character thus searched instead of the character displayed on the display unit 21. For example, in a case in which an unknown telephone number is in a missed call list, this allows a user to search for a region name to which the telephone number is assigned, and to assume a caller from the region name of the telephone number. The processing shown in screens D1 to D34 can be performed also in cases other than the case in which the regular screen D1 is displayed and a character is input by operating the input operation keys 14. For example, the control unit 45 may be configured to perform the processing shown in the screens D31 to D34 in a case in which only an editor is activated and a character is input by operating the input operation keys 14.

In a state in which the regular screen D1 is displayed in the display unit 21, in a case in which a character and a numerical character are input by an operation on the input operation key 14 and a part of the character is determined to be at least a part of the predetermined character stored in the memory 44, the control unit 45 clears display of the numerical character being input along with the character and appends the predetermined numerical character stored in the memory 44 in association with the predetermined character in front of the numerical character being displayed on the display unit 21.

Figure 10:
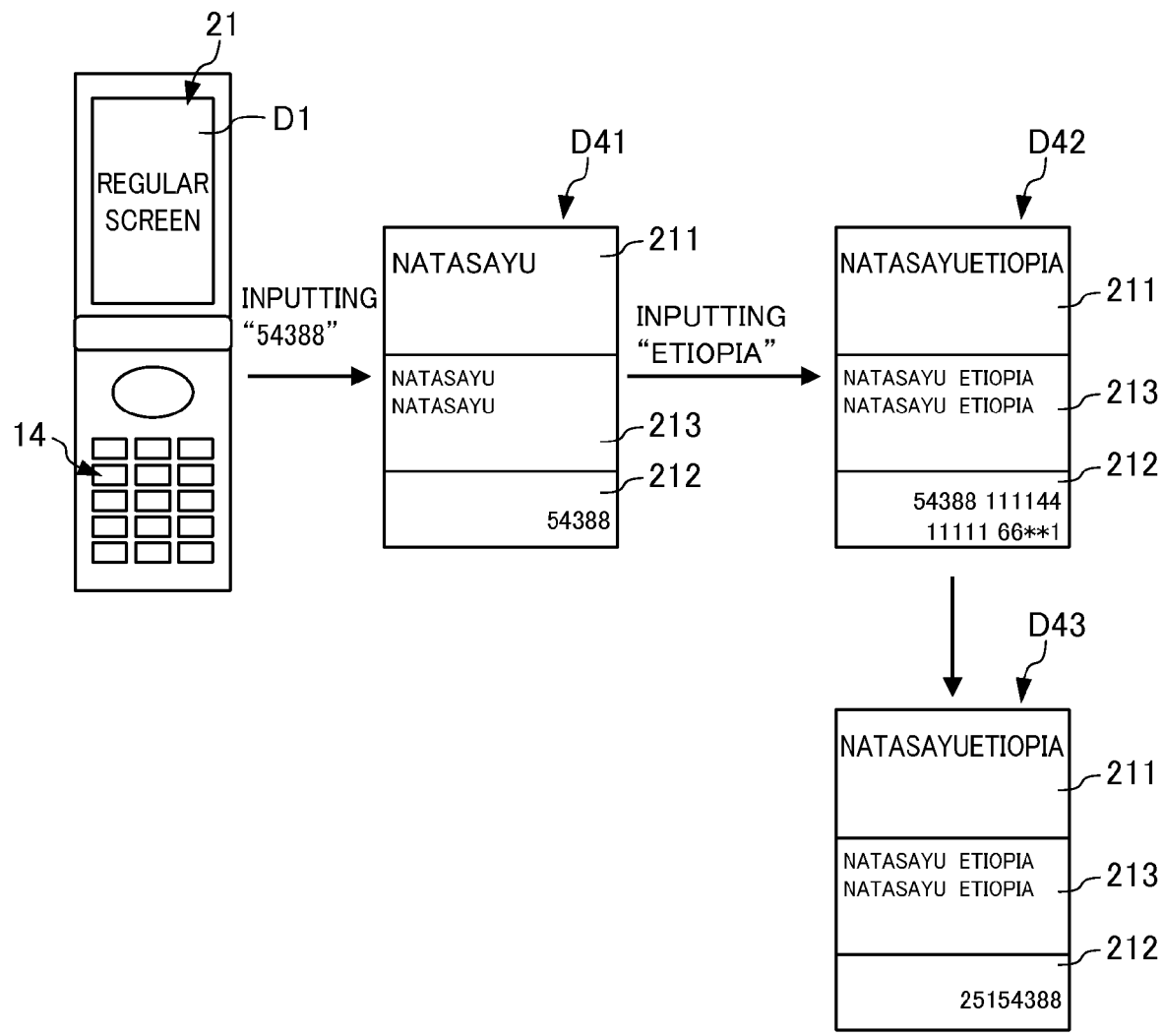
FIG. 10 is a diagram illustrating another example (4) of screen transitions displayed on the display unit according to the present embodiment.

More specifically, the control unit 45 performs the following processing. FIG. 10 is a diagram illustrating another example of screen transitions displayed on the display unit 21 according to the present embodiment. In a state in which the regular screen D1 as an initial screen is displayed, if a numerical character "54388" is input by operating the input operation keys 14, the control unit 45 inputs and displays a hiragana character "natasayu" assigned to the input operation keys 14 in a region 211, inputs and displays the numerical character "54388" assigned to the input operation keys 14 in the region 212, and displays the hiragana character "natasayu" and a katakana character "natasayu" as conversion candidates in the region 213 (screen D41 in FIG. 10).

In the screen D41, if a character "etiopia" is input by operating the input operation keys 14, the control unit 45 inputs and displays a hiragana character "etiopia" assigned to the input operation keys 14 in a region 211, inputs and displays the numerical character "1111441111166**" assigned to the input operation keys 14 in the region 212, and displays the hiragana character "natasayuetiopia" and a katakana character "natasayuetiopia" as conversion candidates in the region 213 (screen D42 in FIG. 10).

And then, the control unit 45 determines whether or not a part of the hiragana character "natasayuetiopia" input to the region 211 is at least a part of a predetermined character registered in the dictionary table 44a.

In a case in which a part of the hiragana character "natasayuetiopia" being input to the region 211 is determined to be at least a part of a predetermined character registered in the dictionary table 44a, the control unit 45 clears display of the "1111441111166" from the numerical character "543881111441111166" displayed in the region 213. The control unit 45 appends the numerical character "251", which is registered in the dictionary table 44a in association with the hiragana character "etiopia", in front of the numerical character "54388" displayed in the region 213 (screen D43 in FIG. 10).

As described above, in the present embodiment, the control unit 45 clears display of a part of the numerical character displayed in the region 213 and, in front thereof, displays the numerical character registered in the dictionary table 44a in association with the character. As a result, the portable telephone device 1 allows a user to input a region code such as a country code and an area code, without switching between input modes even after inputting other numerical characters, thereby improving convenience for a user.

In the above-described embodiment, country codes and area codes are used; however, the present invention is not limited thereto. For example, a term "hituuti" (Japanese term corresponding to a call with anonymous number) can be registered in the dictionary table 44a in association with a prefix code "184"; and a term "keisatu" (Japanese term corresponding to police) can be registered in the dictionary table 44a in association with a prefix code "110".

The address book and the dictionary table 44a can be associated and the control unit 45 may be configured to display a telephone number registered in association with a character being input (destination of call) on the display unit 21.

If a character "nihonsatousan" is input by operating the input operation keys 14, the control unit 45 inputs and displays a hiragana character "nihonsatousan" assigned to the input operation keys 14 in the region 211, inputs and displays a numerical character "5566666000344444111" assigned to the input operation keys 14 in the region 212, and displays characters "nihonsatousan" (consisting of hiragana characters), "nihonsatousan" (consisting of kanji and hiragana characters) and the like as conversion candidates in the region 213.

And then, in a case in which there is a telephone number associated to "satousan" registered in the address book, the control unit 45 displays a numerical character "81090XXXXXXX" consisting of "81" (country code) and "090XXXXXXX" (telephone number of Mr. Sato (satousan)) in the region 212, instead of the numerical character "5566666000344444111".

The cellular telephone 1 may be provided with a GPS antenna; the control unit 45 may be configured to obtain geographical information of the portable telephone device 1 by means of the GPS antenna; and geographical information (for example, America), a predetermined numerical character (for example, 911) and a predetermined character (for example, "keisatu" (Japanese term corresponding to police)) may be registered in the memory 44 in association with each other.

The control unit 45, in a case in which the operation key 14 is operated and a character is input as an input character and the input character is determined to be at least a part of the predetermined character stored in the memory 44 (for example, "keisatu" (Japanese term corresponding to police)), maintains the display of the character on the display unit 21 and displays a predetermined numerical character (for example, 911) associated with the predetermined character on the display unit 21 based on the geographical information being obtained (for example, America).

Figure 11:
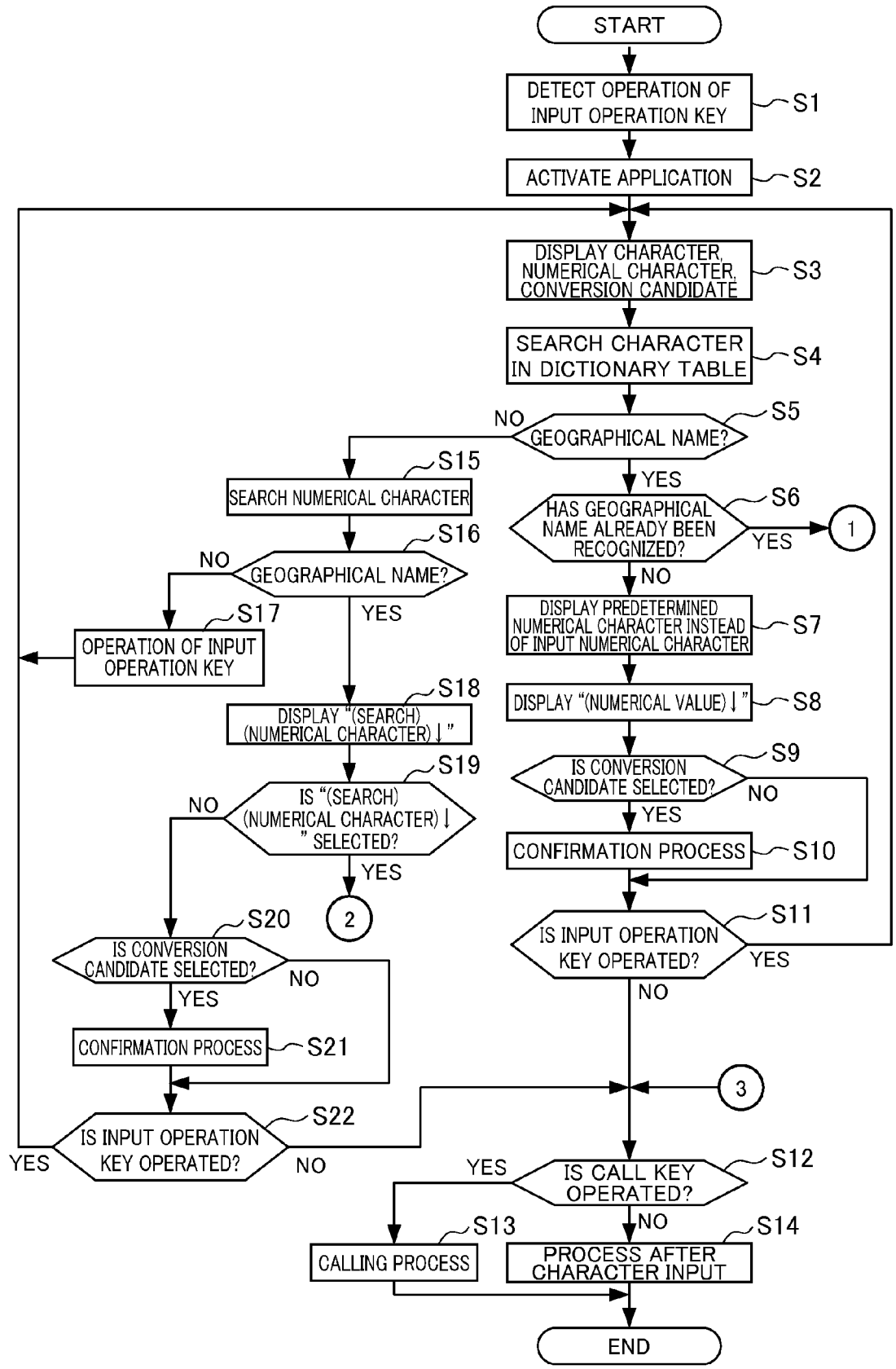
FIG. 11 is a flow chart (1) showing internal processing by the portable telephone device according to the present embodiment.
Figure 12:
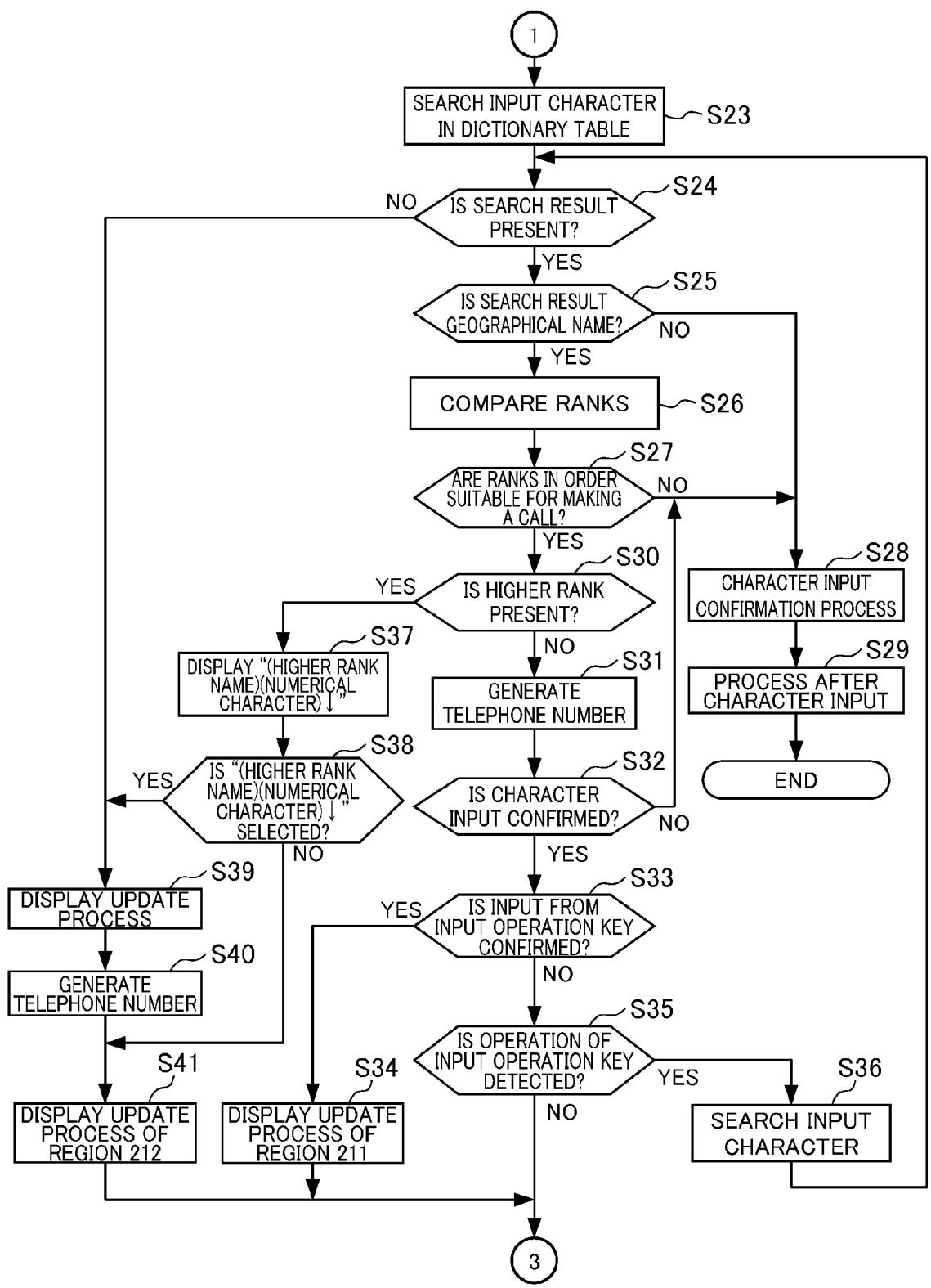
FIG. 12 is a flow chart (2) showing internal processing by the portable telephone device according to the present embodiment.
Figure 13:
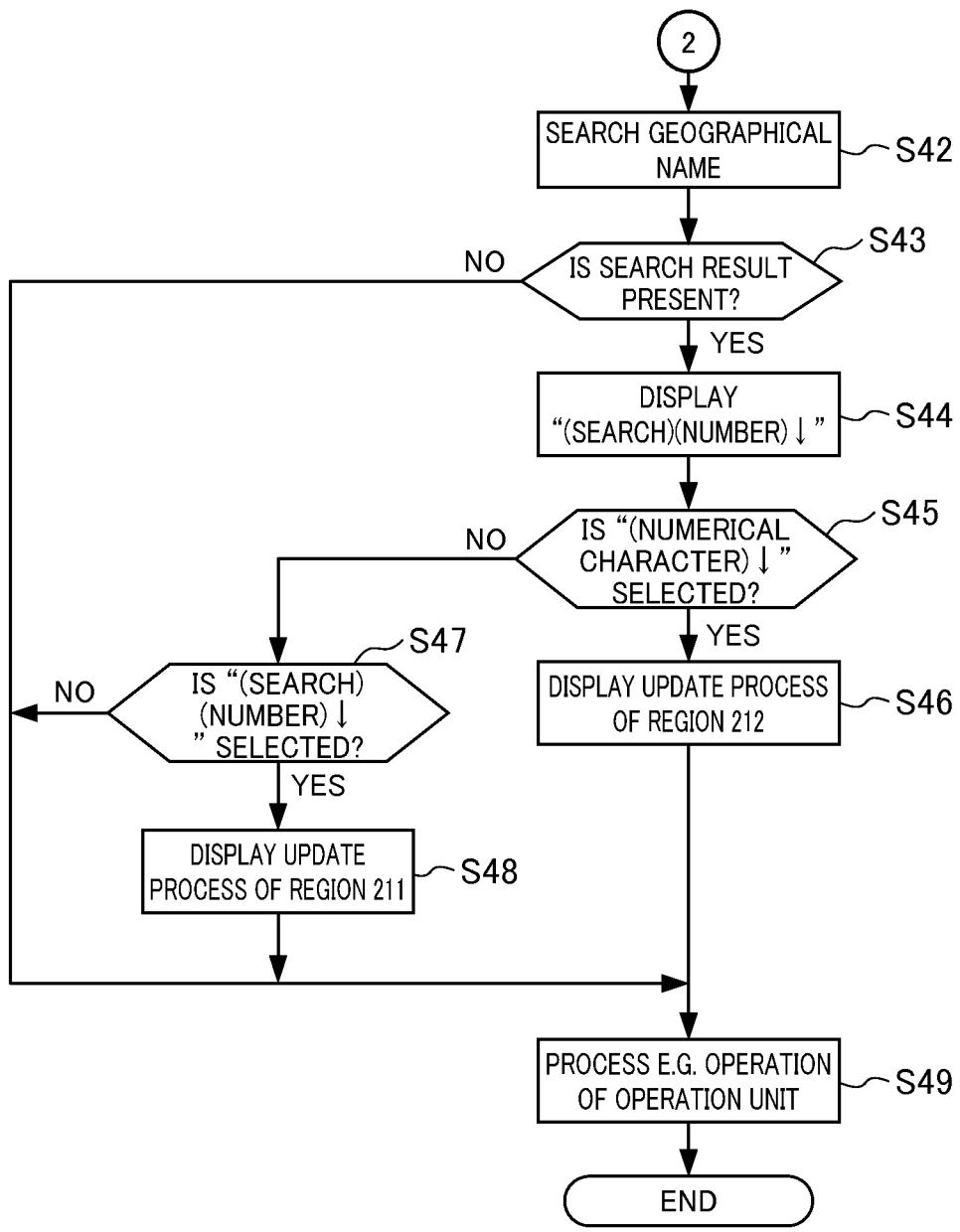
FIG. 13 is a flow chart (3) showing internal processing by the portable telephone device according to the present embodiment.

Next, internal processing of the portable telephone device 1 of the present embodiment is described with reference to FIGS. 11 to 13. FIGS. 11 to 13 are flow charts showing internal processing by the portable telephone device 1 according to the present embodiment.

In Step S1, in a state in which the regular screen D1 as an initial screen is displayed, the control unit 45 detects an operation on the input operation key 14. In Step S2, the control unit 45 performs a process of activating an application A for editing characters and numerical characters being input (hereinafter referred to simply as "application A") in response to the detection of the operation on the input operation key 14.

In Step S3, the control unit 45 inputs and displays a character assigned to the input operation key 14 in the region 211, inputs and displays a numerical character assigned to the input operation key 14 in the region 212, and displays conversion candidates in the region 213. In Step S4, the control unit 45 searches in the dictionary table 44a for the character displayed in the region 211.

In Step S5, the control unit 45 determines whether or not the character displayed in the region 211 is at least a part of a region name such as a country name and a prefecture name registered in the dictionary table 44a. If the character displayed in the region 211 is a region name (YES), the processing is advanced to Step S6. If the character displayed in the region 211 is not a region name (NO), the processing is advanced to Step S15.

In Step S6, the control unit 45 determines whether or not the character (region name) displayed in the region 211 is a region name having been previously recognized. If the region name is a region name having been previously recognized (YES), the processing is advanced to Step S23 (see FIG. 12). If the region name is not a region name having been previously recognized (NO), the processing is advanced to Step S7.

In Step S7, the control unit 45 displays, in the region 212, the numerical character registered in the dictionary table 44a in association with the character displayed in the region 211 instead of the numerical character being input. In Step S8, the control unit 45 updates the memory 44 and frame memory of a driver IC 23 and displays "(numerical value) ↓" along with other conversion candidates in the region 213.

In Step S9, the control unit 45 determines whether or not the character or the numerical character as the conversion candidates in the region 213 is selected by operation of the selection operation key 15 and the like. If the character or the numerical character as the conversion candidates is selected (YES), the processing is advanced to Step S10. If the character or the numerical character as the conversion candidates is not selected (NO), the processing is advanced to Step S11.

In Step S10, the control unit 45 performs a confirmation process of the character or the numerical character being selected by operation of the selection operation key 15 and the like. In Step S11, the control unit 45 determines whether or not an operation of the input operation key 14 is detected. If an operation of the input operation key 14 is detected (YES), the processing is returned to Step S3. If an operation of the input operation key 14 is not detected (NO), the processing is advanced to Step S12.

In Step S12, the control unit 45 determines whether or not an operation of the call key 16 is detected. If an operation of the call key 16 is detected (YES), the processing is returned to Step S13. If an operation of the call key 16 is not detected (NO), the processing is advanced to Step S14.

In Step S13, the control unit 45 displays the region name, which is a destination of call, activates a telephone application to perform a call process, and then terminates the processing.

In Step S14, the control unit 45 detects a selection of a process after character input, performs the process after character input by the application A, and then terminates the processing. The process after character input by the application A, may include activation of an e-mail application, activation of a text editor application, and the like.

In Step S15, the control unit 45 searches for the numerical character displayed (input) in the region 212 in the region name table, so-called reverse lookup.

In Step S16, the control unit 45 determines whether or not there is a region name registered in the region name table in association with the numerical character displayed (input) in the region 212. If there is the region name (YES), the processing is advanced to Step S18. If there is not the region name (NO), the processing is advanced to Step S17.

In Step S17, the control unit 45 detects an operation of the input operation key 14 and then the processing is returned to Step S3. In Step S18, the control unit 45 displays a conversion candidate "(kensaku) (numerical character)↓" in the region 213, in addition to other conversion candidates.

In Step S19, the control unit 45 determines whether or not the conversion candidate "(kensaku) (numerical character)↓" is selected by operation of the selection operation key 15 and the like. If "(kensaku) (numerical character)↓" is selected (YES), the processing is advanced to Step S42 (see FIG. 13). If "(kensaku) (numerical character)↓" is not selected (NO), the processing is advanced to Step S20.

In Step S20, the control unit 45 determines whether or not the character or the numerical character as the conversion candidates in the region 213 is selected by operation of the selection operation key 15 and the like. If the character or the numerical character as the conversion candidates is selected (YES), the processing is advanced to Step S21. If the character or the numerical character as the conversion candidates is not selected (NO), the processing is advanced to Step S22.

In Step S21, the control unit 45 performs a confirmation process of the character or the numerical character being selected by operation of the selection operation key 15 and the like. In Step S22, the control unit 45 determines whether or not an operation of the input operation key 14 is detected. If an operation of the input operation key 14 is detected (YES), the processing is returned to Step S3. If an operation of the input operation key 14 is not detected (NO), the processing is advanced to Step S12.

FIG. 12 is a flow chart showing internal processing by the portable telephone device according to the present embodiment. In Step S23, the control unit 45 searches in the dictionary table 44a for the character being input after the region name recognized in Step S6.

In Step S24, the control unit 45 determines whether or not the character being input after the region name is registered in the dictionary table 44a, in other words determines whether or not a search result is present. If there is the search result (YES), the processing is advanced to Step S25. If there is not the search result (NO), the processing is advanced to Step S39.

In Step S25, the control unit 45 determines whether or not the search result is also a region name. If the search result is also a region name (YES), the processing is advanced to Step S26. If the search result is not a region name (NO), the processing is advanced to Step S28.

In Step S26, the control unit 45 compares ranks of the region name recognized in Step S6 and the region name determined in Step S25. Here, the "rank" indicates a relationship between region names, and for example "Kanagawa Prefecture" is of a higher rank than "Yokohama City".

In Step S27, the control unit 45 determines whether or not the ranks of the region names compared in Step S26 are in an order suitable for making a call. If the ranks are in an order suitable for making a call (YES), the processing is advanced to Step S30. If the ranks are not in an order suitable for making a call (NO), the processing is advanced to Step S28.

The "order suitable for making a call" indicates that the rank of the region name recognized in Step S6 is higher than the rank of the region name determined in Step S25. For example, in a case in which the region name recognized in Step S6 is "Kanagawa Prefecture" and the region name determined in Step S25 is "Yokohama City", the ranks are in the order suitable for making a call. On the contrary, in a case in which the region name recognized in Step S6 is "Yokohama City" and the region name determined in Step S25 is "Kanagawa Prefecture", the ranks are in the order not suitable for making a call.

In Step S28, the control unit 45 performs a process for confirming input of the character displayed in the region 211 and updates the display of the region 211. In Step S29, the control unit 45 detects a selection of a process after character input and performs the process after character input by the application A.

In Step S30, the control unit 45 determines whether or not there is a rank higher than those of the region name recognized in Step S6 and the region name determined in Step S25. If there is the higher rank (YES), the processing is advanced to Step S37. If there is not the higher rank (NO), the processing is advanced to Step S31. For example, a country name "Japan" is in a higher rank than the region names "Kanagawa Prefecture" and "Yokohama City".

In Step S31, the control unit 45 generates a telephone number from the numerical characters associated with the region name recognized in Step S6 and the region name determined in Step S25, and displays the telephone number thus generated in the region 212.

In Step S32, the control unit 45 determines whether or not the character input is confirmed by operation of the selection operation key 15 and the like. If the character input is confirmed (YES), the processing is advanced to Step S33. If the character input is not confirmed (NO), the processing is advanced to Step S28.

In Step S33, the control unit 45 determines whether or not the input from the input operation keys 14 is confirmed by operation of the selection operation key 15 and the like. If an operation confirming the input is performed (YES), the processing is advanced to Step S34. If an operation confirming the input is not performed (NO), the processing is advanced to Step S35.

In Step S34, the control unit 45 clears the region 212 and displays only the regions 211 and 213. In other words, the control unit 45 performs a display update process of the display unit 21.

In Step S35, the control unit 45 determines whether or not an operation of the input operation key 14 is detected. If an operation of the input operation key 14 is detected (YES), the processing is advanced to Step S36. If an operation of the input operation key 14 is not detected (NO), the processing is advanced to Step S12 (see FIG. 11).

In Step S36, the control unit 45 searches in the dictionary table 44a for the character being input in the region 211 by the operation of the input operation key 14 in Step S34, and the processing is advanced to Step S24. In Step S37, the control unit 45 displays a conversion candidate "(upper rank name) (numerical character)↓" in the region 213, in addition to other conversion candidates.

In Step S38, the control unit 45 determines whether or not the conversion candidate "(upper rank name) (numerical character)↓" is selected by operation of the selection operation key 15 and the like. If the conversion candidate "(upper rank name) (numerical character)↓" is selected (YES), the processing is advanced to Step S39. If the conversion candidate "(upper rank name) (numerical character)↓" is not selected (NO), the processing is advanced to Step S41.

In Step S39, the control unit 45 clears the region 212 and displays only the regions 211 and 213. In other words, the control unit 45 performs a display update process of the display unit 21. In Step S40, the control unit 45 generates a telephone number from the numerical characters associated with the region name recognized in Step S6 and/or the region name displayed in Step S39.

In Step S41, the control unit 45 displays the telephone number thus generated in the region 212. In other words, the control unit 45 performs a display update process of the display unit 21. And then, the control unit 45 returns the processing to Step S12 (see FIG. 11).

FIG. 13 is a flow chart showing internal processing by the portable telephone device according to the present embodiment. In Step S42, the control unit 45 searches in the region name table for a region name registered in association with the numerical character displayed in the region 212. In Step S43, the control unit 45 determines whether a region name registered in association with the numerical character displayed in the region 212 is found in the region name table, in other words whether or not there is a search result. If there is the search result (YES), the processing is advanced to Step S44. If there is not the search result (NO), the processing is advanced to Step S49.

In Step S44, the control unit 45 displays, in the region 213, a conversion candidate "(kensaku) (numerical character)↑" including the numerical character associated with the region name being found.

In Step S45, the control unit 45 determines whether or not the conversion candidate "(numerical character)↓" is displayed in the region 213 and the conversion candidate "(numerical character)↓" is selected by operation of the selection operation key 15 and the like. If the conversion candidate "(numerical character)↓" is selected (YES), the processing is advanced to Step S46. If the conversion candidate "(numerical character)↓" is not selected (NO), the processing is advanced to Step S47.

In Step S46, the control unit 45 performs a display update process of the display unit 21. In Step S47, the control unit 45 determines whether or not the conversion candidate "(kensaku) (numerical character)↑" is selected by operation of the selection operation key 15 and the like. If the conversion candidate "(kensaku) (numerical character)↑" is selected (YES), the processing is advanced to Step S48. If the conversion candidate "(kensaku) (numerical character)↑" is not selected (NO), the processing is advanced to Step S49.

In Step S48, the control unit 45 performs a display update process of the region 211. In Step S49, the control unit 45 advances the processing to a process such as operation of the operation unit 11 and the like, and then terminates the processing.

As described above, according to the present embodiment, the portable telephone device 1 can easily convert character to numerical character and numerical character to character, and the character or the numerical character can be used in an application (for example, telephone application).

Figure 14:
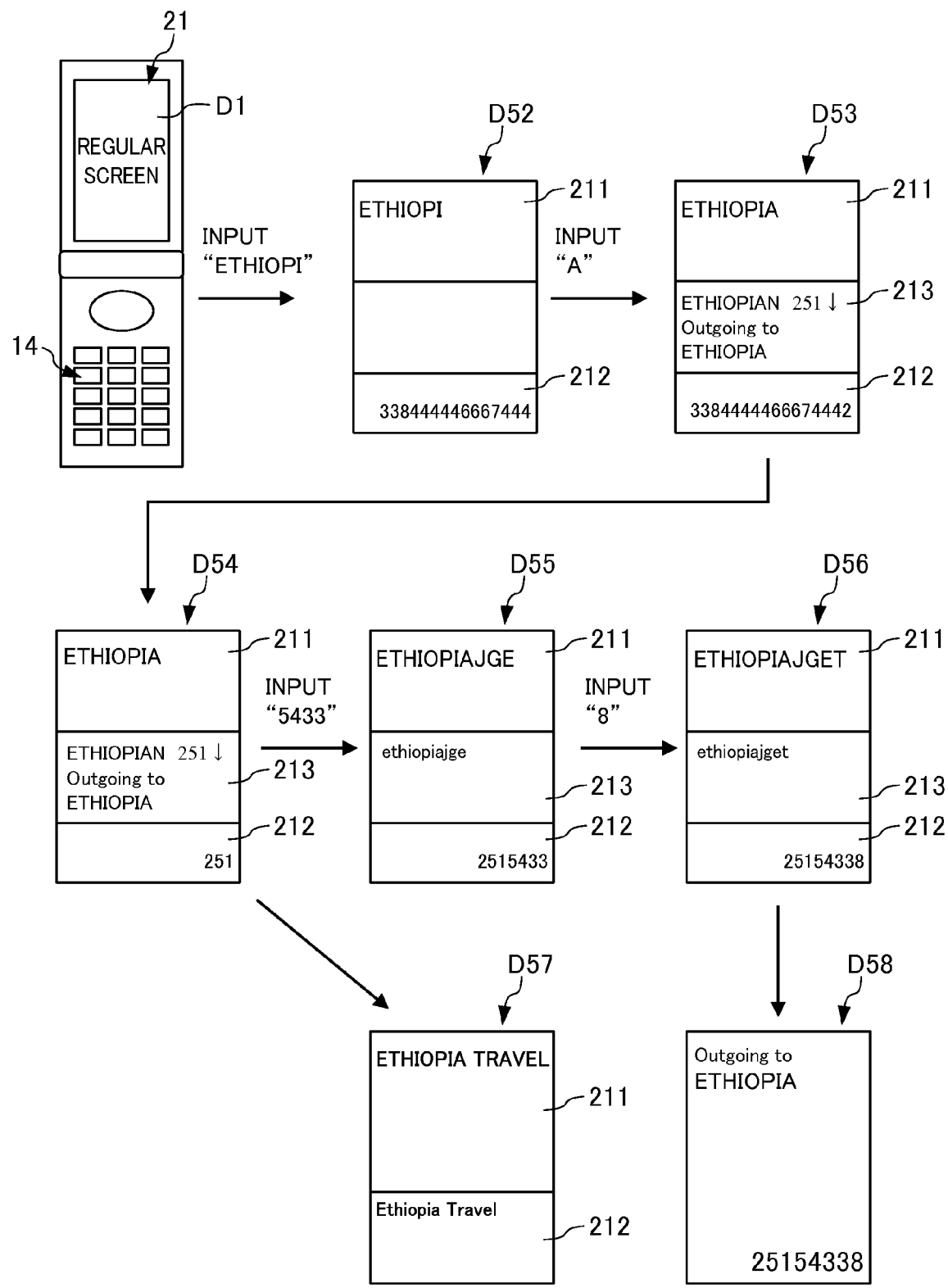
FIG. 14 is a diagram in English illustrating another example (1) of screen transitions displayed on the display unit according to the present embodiment.

Next, an embodiment in English notation is described with reference to FIGS. 14 to 18. FIG. 14 is a diagram illustrating an example of screen transitions displayed on the display unit 21 in English. The embodiment illustrated in FIG. 14 corresponds to the embodiment illustrated in FIG. 5. In a state in which the regular screen D1 as an initial screen is displayed, if a character "ETHIOPI" is input by operating the input operation keys 14, the control unit 45 inputs and displays a character "ETHIOPI" assigned to the input operation keys 14 in a region 211 of the display unit 21, and inputs and displays a numerical character "338444446667444" assigned to the input operation keys 14 in the region 212 of the display unit 21 (screen D52 in FIG. 14). Alternatively, in a state in which the regular screen D1 as an initial screen is displayed, if the character "ETHIOPI" is input by operating the input operation keys 14, the control unit 45 may be configured to input and display only the character "ETHIOPI" assigned to the input operation keys 14 in a region 211 of the display unit 21.

In the screen D52, if a character "A" is input by operating the input operation key 14, the control unit 45 inputs and displays a character "A" assigned to the input operation key 14 in the region 211, and inputs and displays a numerical character "2" assigned to the input operation key 14 in the region 212 (screen D53 in FIG. 14). The control unit 45 further displays "ETHIOPIAN", "251↓", and "Outgoing to ETHIOPIA" as conversion candidates in the region 213 of the display unit 21 (screen D53 in FIG. 14).

The "251↓" displayed as a conversion candidate in the region 213 indicates displaying the numerical character "251" in the region 212.

In the screen D53, since the character "ETHIOPIA" displayed in the region 211 is registered in the dictionary table 44a in association with the numerical character "251" as the prefix code, the control unit 45 displays the numerical character "251" as the prefix code in the region 212 instead of displaying the numerical character "3384444466674442" being input by operating the input operation keys 14 (screen D54 in FIG. 14).

In the screen D54, if a numerical character "5433" is input by operating the input operation key 14, the control unit 45 inputs and displays a character "JGE" assigned to the input operation key 14 in the region 211, inputs and displays a numerical character "5344" assigned to the input operation key 14 in the region 212, and displays a character "ethiopiajge" as a conversion candidate in the region 213 (screen D55 in FIG. 14).

In the screen D55, if a numerical character "8" is input by operating the input operation key 14, the control unit 45 inputs and displays a character "T" assigned to the input operation key 14 in the region 211, inputs and displays a numerical character "8" assigned to the input operation key 14 in the region 212, and displays a character "ethiopiajget" as a conversion candidate in the region 213 (screen D56 in FIG. 14).

In the screen D56, in a case in which the character "ETHIOPIA" and "country name" are registered in the dictionary table 44a in association with each other and the character "JGET" being subsequently input is not registered in the dictionary table 44a, the control unit 45 confirms input of the numerical character "25154338" displayed in the region 212. And then, if a call key 16 in the operation unit 11 is operated, the control unit 45 activates a telephone application and makes a call to the numerical character "2515433", while displaying a text "Outgoing to Ethiopia" and the numerical character "2515433" (screen D58 in FIG. 14). Alternatively, the control unit 45 may be configured to, when the call key 16 in the operation unit 11 is operated, activate the telephone application after displaying a confirmation screen for making a call, and accepting a selection of making the call.

In addition, in the screen D54, in a case in which: the character "ETHIOPIA" and "country name" are registered in the dictionary table 44a in association with each other; a character "TRAVEL" being subsequently input is registered in another dictionary table; and the character "TRAVEL" is not a geographical name such as "country name" and "city name", the control unit 45 confirms an input of a character "ETHIOPIATRAVEL" and displays only the regions 211 and 213. And then, by selecting an application related to character (for example, a mail application, a memopad application, and the like), the application thus selected can be activated with the character "ETHIOPIATRAVEL" being input therein (screen D57 in FIG. 14). The processing shown in screens D1 to D57 can be performed also in cases other than the case in which the regular screen is displayed and a character is input by operating the input operation keys 14. For example, the control unit 45 may be configured to perform the processing shown in the screens D1 to D57 in a case in which only an editor is activated and a character is input by operating the input operation keys 14.

Figure 15:
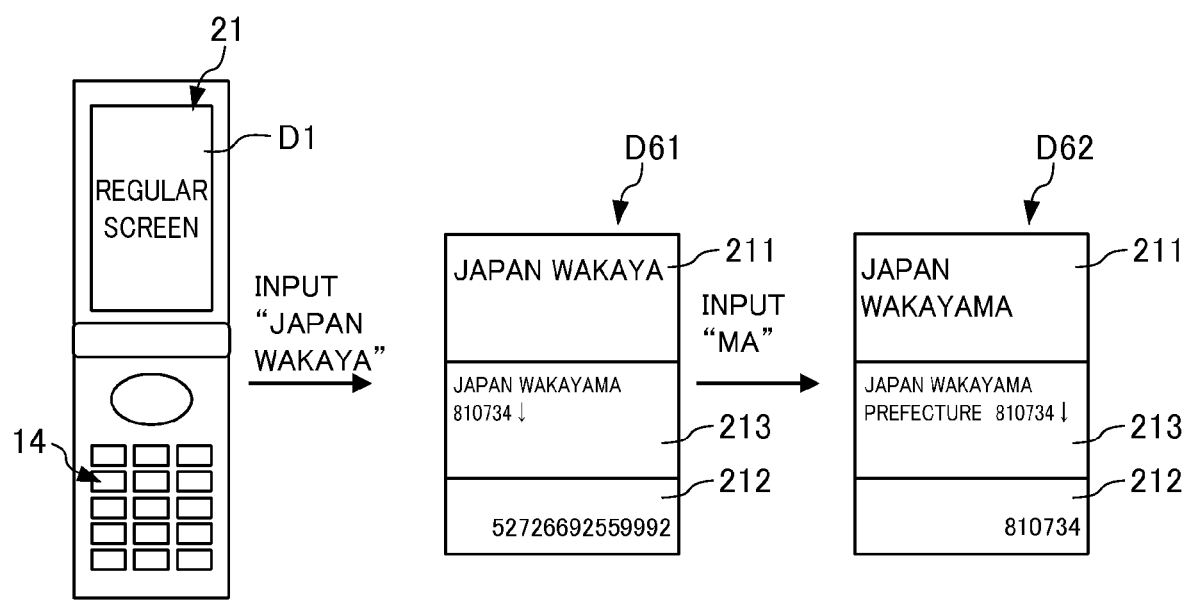
FIG. 15 is a diagram in English illustrating another example (2) of screen transitions displayed on the display unit according to the present embodiment.

FIG. 15 is a diagram illustrating an example of screen transitions displayed on the display unit 21 in English. The embodiment illustrated in FIG. 15 corresponds to the embodiment illustrated in FIG. 7. In a state in which the regular screen D1 as an initial screen is displayed, if a character "JAPANWAKAYA" is input by operating the input operation keys 14, the control unit 45 inputs and displays a character "JAPANWAKAYA" assigned to the input operation keys 14 in a region 211, inputs and displays the numerical character "52726692559992" assigned to the input operation keys 14 in the region 212, and displays the character "JAPAN-WAKAYAMA" and "810734↓" as conversion candidates in the region 213 (screen D61 in FIG. 15).

The "810734↓" in the region 213 displayed as a conversion candidate in the region 213 indicates displaying the numerical character "810734", consisting of a country code for Japan (81) and an area code for Wakayama (0734), in the region 212.

In the screen D61, if a character "MA" is input by operating the input operation key 14, the control unit 45 inputs and displays a character "MA" assigned to the input operation key 14 in the region 211, and displays characters "JAPAN-WAKAYAMAPREFECTURE" and "810734↓" as conversion candidates in the region 213 (screen D62 in FIG. 15). After that a character "MA" is input by operation of the input operation key 14, in a case in which the character "JAPAN" and "country name" are registered in the dictionary table 44a in association with each other and the character "WAKAYAMA" being subsequently input is also registered in the dictionary table 44a, the control unit 45 displays the numerical character "810734" consisting of a country code for Japan (81) and an area code for Wakayama (0734) in the region 212, instead of the numerical character "52726692559992" (screen D62 in FIG. 15). The processing shown in screens D1 to D61 can be performed also in cases other than the case in which the regular screen D1 is displayed and a character is input by operating the input operation keys 14. For example, the control unit 45 may be configured to perform the processing shown in the screens D61 and D62 in a case in which only an editor is activated and a character is input by operating the input operation keys 14.

Figure 16:
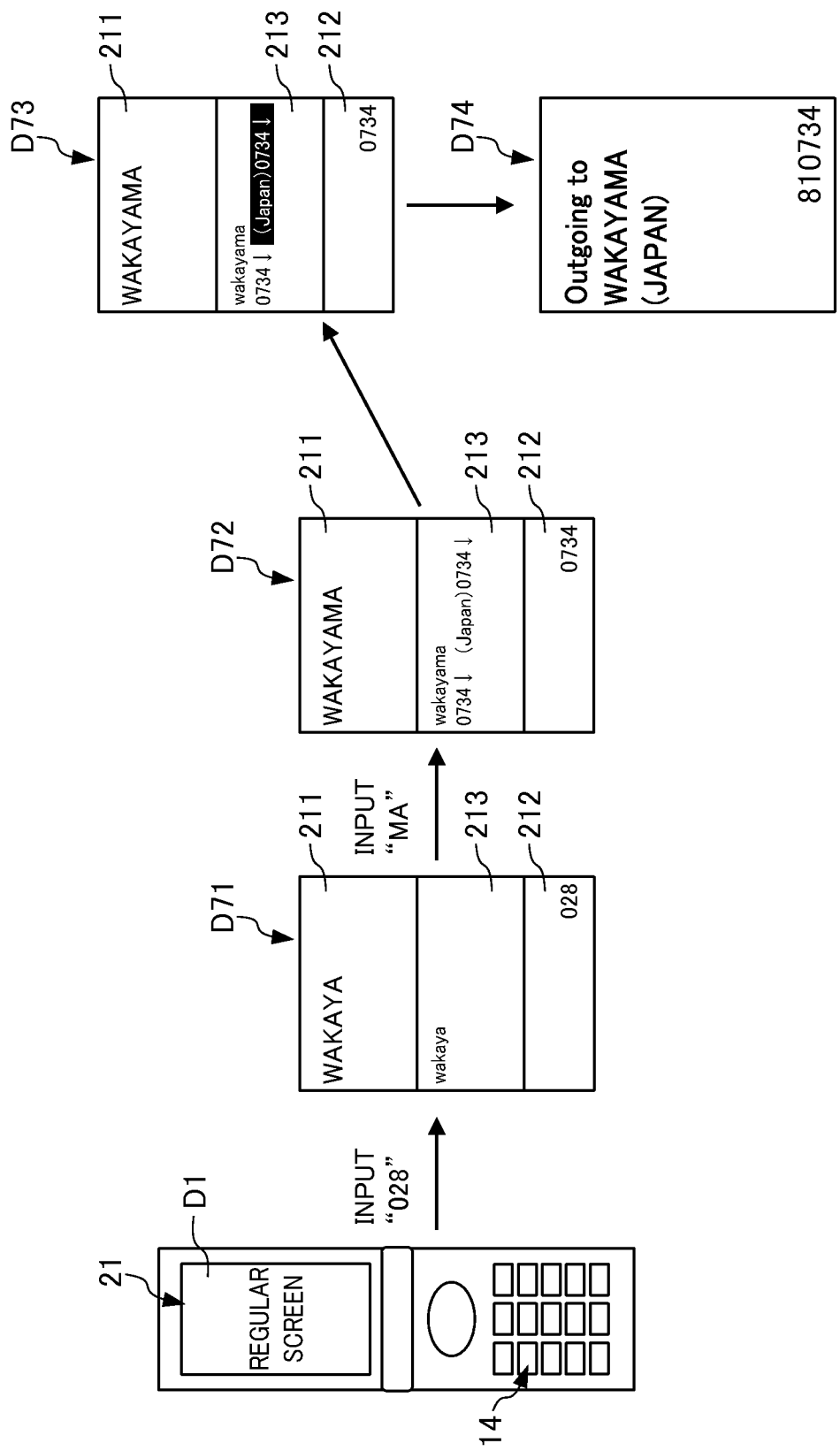
FIG. 16 is a diagram in English illustrating another example (3) of screen transitions displayed on the display unit according to the present embodiment.

FIG. 16 is a diagram illustrating an example of screen transitions displayed on the display unit 21 in English. The embodiment illustrated in FIG. 16 corresponds to the embodiment illustrated in FIG. 8. In a state in which the regular screen D1 as an initial screen is displayed, if a character "WAKAYA" is input by operating the input operation keys 14, the control unit 45 inputs and displays a character "WAKAYA" assigned to the input operation keys 14 in a region 211, inputs and displays the numerical character "92559992" assigned to the input operation keys 14 in the region 212, and displays the character "wakaya" as a conversion candidate in the region 213 (screen D71 in FIG. 16).

In the screen D71, if a character "MA" is input by operating the input operation key 14, the control unit 45 inputs and displays a character "MA" assigned to the input operation key 14 in the region 211, and displays characters "wakayama", "0734↓" and "(Japan) 0734↓" as conversion candidates in the region 213 (screen D72 in FIG. 16). And then, after that a character "MA" is input by operation of the input operation key 14, in a case in which the character "WAKAYAMA" is registered in the dictionary table 44a in association with "prefecture name" and "city name", the control unit 45 displays the numerical character "0734", which is an area code for Wakayama, in the region 212 instead of the numerical character "925529992" (screen D72 in FIG. 16).

The conversion candidate "0734↓" displayed in the region 213 indicates displaying the numerical character "0734" in the region 212, and the conversion candidate "(Japan) 0734↓" indicates displaying the numerical character "810734" consisting of a country code for Japan (81) and an area code for Wakayama (0734) in the region 212.

In the screen D72, if the conversion candidate "(Japan) 0734↓" is selected by operating the selection operation key 15 or the like (screen D73 of FIG. 16), the control unit 45 activates a telephone application and makes a call to the numerical character "810734", while displaying a text "Outgoing to WAKAYAMA (Japan)" and the numerical character "810734" (screen D74 in FIG. 16). The processing shown in screens D1 to D73 can be performed also in cases other than the case in which the regular screen is displayed and a character is input by operating the input operation keys 14. For example, the control unit 45 may be configured to perform the processing shown in the screens D71 to D73 in a case in which only an editor is activated and a character is input by operating the input operation keys 14.

Figure 17:
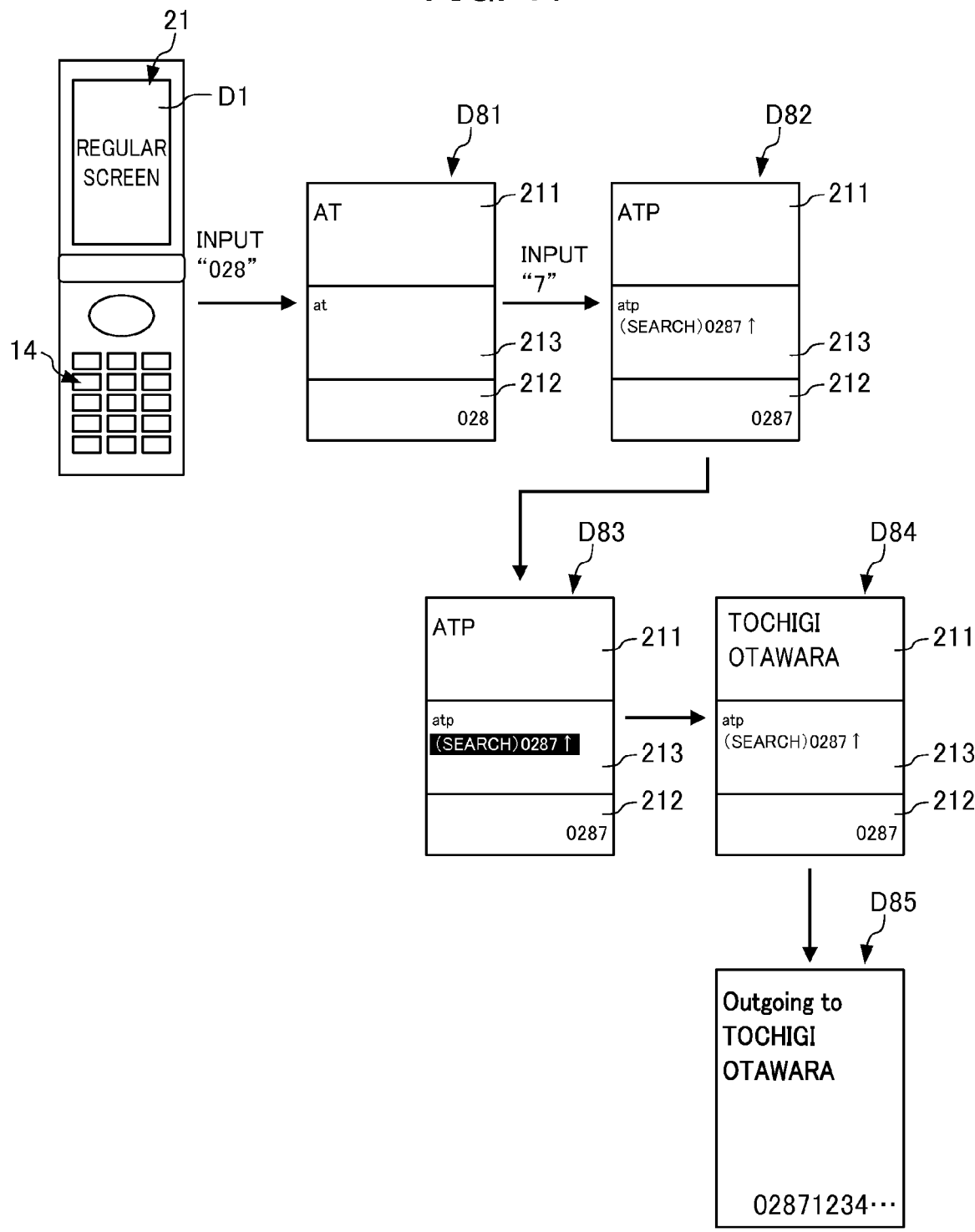
FIG. 17 is a diagram in English illustrating another example (4) of screen transitions displayed on the display unit according to the present embodiment.

FIG. 17 is a diagram illustrating an example of screen transitions displayed on the display unit 21 in English. The embodiment illustrated in FIG. 17 corresponds to the embodiment illustrated in FIG. 9. In a state in which the regular screen D1 as an initial screen is displayed, if a numerical character "028" is input by operating the input operation keys 14, the control unit 45 inputs and displays a character "AT" assigned to the input operation keys 14 (no character is assigned to 0) in a region 211, inputs and displays the numerical character "028" assigned to the input operation keys 14 in the region 212, and displays the character "at" as a conversion candidate in the region 213 (screen D81 in FIG. 17).

In the screen D81, if a numerical character "7" is input by operating the input operation key 14, the control unit 45 inputs and displays a character "P" assigned to the input operation key 14 in the region 211, inputs and displays a numerical character "7" assigned to the input operation key 14 in the region 212, and displays a character "atp" and "(SEARCH) 0287↑" as conversion candidates in the region 213 (screen D82 in FIG. 17).

Here, the conversion candidate "(SEARCH) 0287↑" displayed in the region 213 indicates searching for a region name having "0287" as a region code such as a country code or an area code, and displaying the region name thus searched in the region 211.

In the screen D82, if the conversion candidate "(SEARCH) 0287↑" is selected by operating the selection operation key 15 and the like (screen D83 in FIG. 17), the control unit 45 searches for a region name having "0287" using a region name table, in which region codes such as country codes and area codes are registered in association with geographical names such as country names and region names, in the memory 44. And then, the control unit 45 displays a region name "TOCHIGIOTAWARA", which is registered in association with "0287", instead of the character "ATP" displayed in the region 211 (screen D84 in FIG. 17).

And then, in the screen D84, if a numerical character "1234 . . . " is input by operating the input operation keys 14 and the call key 16 of the operation unit 11 is operated, the control unit 45 activates a telephone application and makes a call to a numerical character "02871234 . . . ", while displaying a character "Outgoing to TOCHIGIOTAWARA" and the numerical character "02871234 . . . " (screen D85 in FIG. 17). The processing shown in screens D1 to D85 can be performed also in cases other than the case in which the regular screen is displayed and a character is input by operating the input operation keys 14. For example, the control unit 45 may be configured to perform the processing shown in the screens D81 to D85 in a case in which only an editor is activated and a character is input by operating the input operation keys 14.

Figure 18:
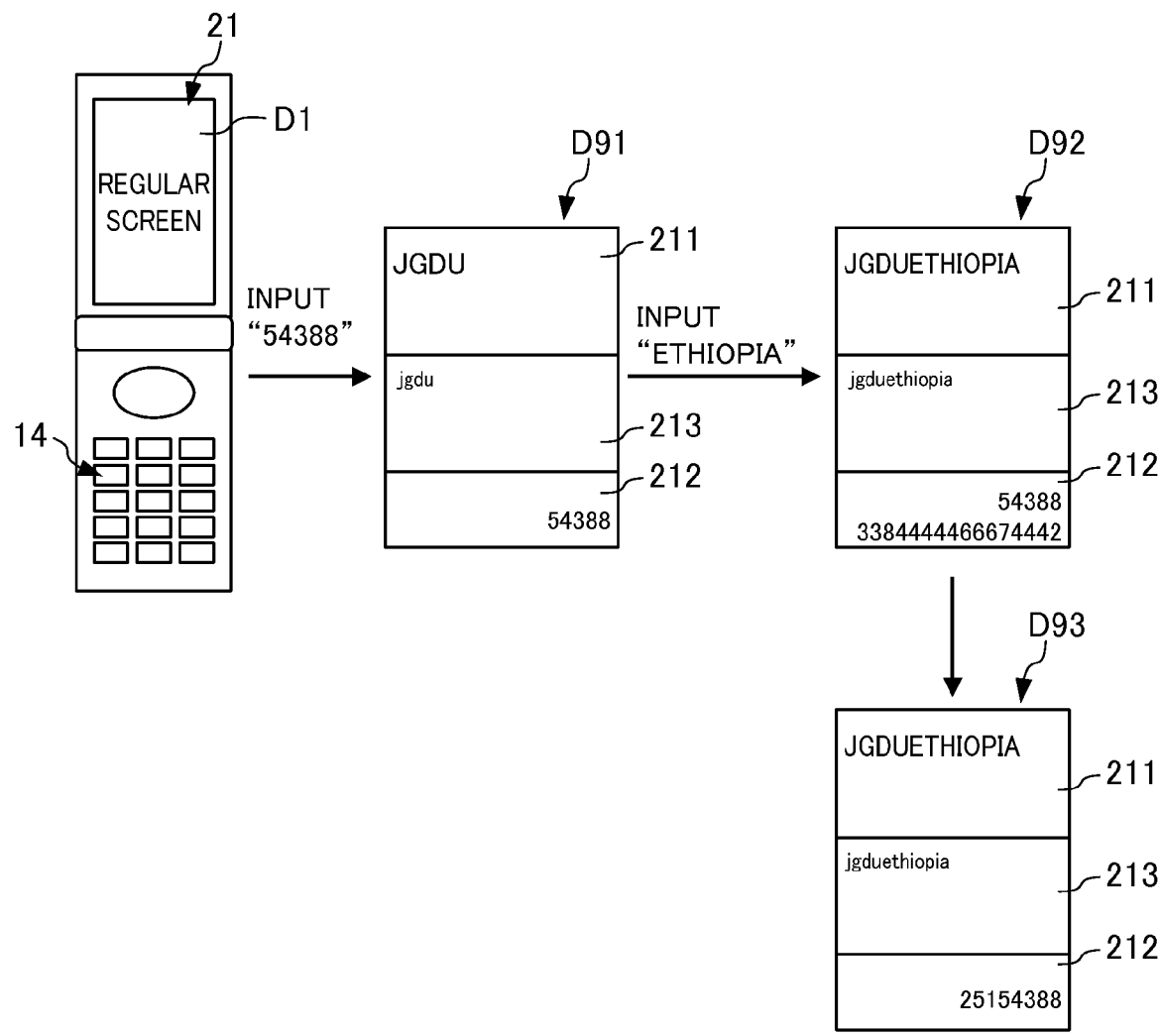
FIG. 18 is a diagram in English illustrating another example (5) of screen transitions displayed on the display unit according to the present embodiment.

FIG. 18 is a diagram illustrating another example of screen transitions displayed on the display unit 21 in English. The embodiment illustrated in FIG. 18 corresponds to the embodiment illustrated in FIG. 10. In a state in which the regular screen D1 as an initial screen is displayed, if a numerical character "54388" is input by operating the input operation keys 14, the control unit 45 inputs and displays a character "JGDU" assigned to the input operation keys 14 in a region 211, inputs and displays the numerical character "54388" assigned to the input operation keys 14 in the region 212, and displays the character "jgdu" as a conversion candidate in the region 213 (screen D91 in FIG. 18).

In the screen D91, if a character "ETHIOPIA" is input by operating the input operation key 14, the control unit 45 inputs and displays a character "ETHIOPIA" assigned to the input operation key 14 in the region 211, inputs and displays a numerical character "3384444466674442" assigned to the input operation key 14 in the region 212, and displays a character "jgduethiopia" as a conversion candidate in the region 213 (screen D92 in FIG. 18).

And then, the control unit 45 determines whether or not a part of the character "JGDUETHIOPIA" input to the region 211 is at least a part of a predetermined character registered in the dictionary table 44a.

In a case in which a part of the character "JGDUETHIOPIA" being input to the region 211 is determined to be at least a part of a predetermined character registered in the dictionary table 44a, the control unit 45 clears display of the "3384444466674442" from the numerical character "543883384444466674442" displayed in the region 213. Furthermore, the control unit 45 appends the numerical character "251", which is registered in the dictionary table 44a in association with the character "ETHIOPIA", in front of the numerical character "54388" displayed in the region 213 (screen D93 in FIG. 18). The processing shown in screens D1 to D93 can be performed also in cases other than the case in which the regular screen is displayed and a character is input by operating the input operation keys 14. For example, the control unit 45 may be configured to perform the processing shown in the screens D91 to D93 in a case in which only an editor is activated and a character is input by operating the input operation keys 14.

As described above, according to the embodiment, the present invention can be applied to languages other than Japanese.

Although the embodiments of the present invention have been described above, the present invention is not limited to the aforementioned embodiments, and can be modified as appropriate. In the above-described embodiment, the portable telephone device 1 as the electronic device has been described; however, the present invention can also be applied to other electronic devices having a telephone function. For example, the electronic device of the present invention may be a digital camera, a PHS (Personal Handyphone System), a PDA (Personal Digital Assistant), a portable navigation device, a PC, a notebook PC, a mobile gaming device or the like provided with a telephone function.

EXPLANATION OF REFERENCE NUMERALS

1 Portable telephone device
11 Operation unit
15 Input operation key (Operation key)
21 Display unit
44 Memory (Storage unit)
45 Control unit

The invention claimed is:

1. An electronic device, comprising:
operation keys, one of the operation keys being assigned with a numerical character and a character;
a display module configured to display one or more characters;
a storage module configured to store a first plurality of character strings, a second plurality of numerical characters, and a registered character that is registerable in advance, wherein one of the first plurality of character strings is assigned to one of the second plurality of numerical characters; and
a control module configured to,
when one or more operation keys are operated, display one or more characters as one or more input characters in response to operations to the one or more operation keys,
when the one or more input characters are matched at least a part of one of the character strings, display the numerical character assigned to a matched one of the character strings,
wherein
the control module is configured to, when an activation instruction for an application related to the one or more input characters or the matched one of the numerical characters is given in a state in which the one or more input characters and the matched one of the numerical characters are displayed on the display module, display the application in a state in which any one of the one or more input characters and the matched one of the numerical characters is input thereto,
when said one of the operation keys is operated, the control module is configured to input and display on the display module the character and the numerical character assigned to said one of the operation keys as the input character and an input numerical character, and
when the input character being input by an operation on said one of the operation keys corresponds to the registered character, the control module is configured to continue display of the input character on the display module and clear display of the input numerical character from the display module.

2. The electronic device according to claim 1, wherein, when the one or more input characters are matched at least a part of one of the first plurality of character strings, the control module is configured to display the matched one of the second plurality of numerical characters instead of displaying the input numerical character being input by the operation on said one of the operation keys.

3. The electronic device according to claim 1, wherein, when the input numerical character being input by the operation on said one of the operation keys corresponds to one of the second plurality of numerical characters stored in the storage module, the control module is configured to
search for one of the first plurality of character strings assigned to one of the second plurality of numerical characters, and
display the one of the first plurality of character strings on the display module, but not to display the input character being input by the operation on said one of the operation keys.

4. The electronic device according to claim 1, wherein, when an input character and an input numerical character are input by an operation on the operation keys and a part of the input character is matched at least a part of one of the first plurality of character strings, the control module is configured to clear display of the input numerical character being input along with the input character, and
append one of the second plurality of numerical characters assigned to one of the first plurality of character strings in front of the input numerical character being displayed on the display module.

5. The electronic device according to claim 1, wherein the control module is configured to
cause the one or more input characters and the matched one of the numerical characters displayed on the display module to be selectable, and
display the application in a state in which the one or more input characters or the matched one of the numerical characters is selected and input thereto.

6. The electronic device according to claim 1, further comprising a detection module disposed to correspond to a surface of the display module and configured to detect a contact on the display module, wherein
the display module is configured to further display the operation key; and
the display module is configured to detect an operation by the operation keys in response to the contact to the display module.

7. The electronic device according to claim 1, wherein the control module is configured to accept an operation by the operation keys in a state in which a regular screen is displayed on the display module.

8. The electronic device according to claim 1, wherein
the first plurality of character strings comprises a name registered in an address book in the storage unit, and
the second plurality of numerical characters comprises a telephone number registered in the address book in association with the name.

9. The electronic device according to claim 1, wherein the application related to the matched one of numerical character is a telephone application.

10. The electronic device according to claim 1, wherein,
each character of the character strings is not assigned to each character of an assigned one of the numerical characters.

11. An electronic device, comprising:
operation keys;
a display module configured to display one or more characters;
a storage module configured to store a first plurality of character strings and a second plurality of numerical characters, one of the first plurality of character strings is assigned to one of the second plurality of numerical characters; and
a control module configured to,
when one of more operation keys are operated, display one or more characters as one or more input characters in response to operations to the one or more operation keys,
when the one or more input characters are matched at least a part of one of the character strings, display the numerical character assigned to a matched one of the character strings,
wherein
the control module is configured to, in a case in which an activation instruction for an application related to the one or more input characters or the matched one of the numerical characters is given in a state in which the one or more input characters and the matched one of the numerical characters are displayed on the display module, display the application in a state in which any one of the one or more input characters and the matched one of the numerical characters is input thereto, the first plurality of character strings stored in the storage module comprises a country name or a region name; and the second plurality of numerical characters stored in the storage module comprises a country code or a region code.

12. A method of controlling an electronic device, said method comprising:

storing a first plurality of character strings and a second plurality of numerical characters in a storage module, wherein one of the first plurality of character strings is assigned to one of the second plurality of numerical characters;

displaying one or more characters as one or more input characters on a display module in response to operations on operation keys;

when the one or more input characters matches at least a part of one of the character strings, displaying the numerical characters assigned to a matched one of the character strings; and when an activation instruction for an application related to the one or more input characters or the matched one of the numerical characters is given in a state in which the one or more input characters and the matched one of the numerical characters are displayed on the display module, displaying the application in a state in which any one of the one or more input characters and the matched one of the numerical characters is input thereto, wherein the first plurality of character strings stored in the storage module comprises a country name or a region name, and the second plurality of numerical characters stored in the storage module comprises a country code or a region code.

13. The method according to claim 12, wherein, each character of the character strings is not assigned to each character of an assigned one of the numerical characters.

* * * * *